(12) United States Patent
Williams et al.

(10) Patent No.: US 11,086,672 B2
(45) Date of Patent: Aug. 10, 2021

(54) LOW LATENCY MANAGEMENT OF PROCESSOR CORE WAIT STATE

(71) Applicant: INTERNATIONAL BUSINESS MACHINES CORPORATION, Armonk, NY (US)

(72) Inventors: Derek E. Williams, Round Rock, TX (US); Hugh Shen, Round Rock, TX (US); Guy L. Guthrie, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 16/405,582

(22) Filed: May 7, 2019

(65) Prior Publication Data

US 2020/0356409 A1 Nov. 12, 2020

(51) Int. Cl.
| | |
|---|---|
| *G06F 9/48* | (2006.01) |
| *G06F 12/0811* | (2016.01) |
| *G06F 12/0831* | (2016.01) |
| *G06F 9/30* | (2018.01) |
| *G06F 9/52* | (2006.01) |
| *G06F 12/0891* | (2016.01) |
| *G06F 12/0897* | (2016.01) |

(52) U.S. Cl.
CPC .......... *G06F 9/4887* (2013.01); *G06F 9/3009* (2013.01); *G06F 9/30098* (2013.01); *G06F 9/52* (2013.01); *G06F 9/526* (2013.01); *G06F 12/0811* (2013.01); *G06F 12/0831* (2013.01); *G06F 12/0891* (2013.01); *G06F 12/0897* (2013.01)

(58) Field of Classification Search
CPC ...... G06F 9/4887; G06F 9/30098; G06F 9/52; G06F 12/0811; G06F 12/0831; G06F 12/0891
See application file for complete search history.

(56) References Cited

U.S. PATENT DOCUMENTS

| | | | |
|---|---|---|---|
| 7,127,561 | B2 | 10/2006 | Hill et al. |
| 7,197,604 | B2 | 3/2007 | Guthrie et al. |
| 7,228,385 | B2 | 6/2007 | Guthrie et al. |
| 7,363,474 | B2 | 4/2008 | Rodgers et al. |
| 7,475,191 | B2 | 1/2009 | Guthrie et al. |
| 7,500,039 | B2 | 3/2009 | Day et al. |

(Continued)

FOREIGN PATENT DOCUMENTS

CN 101401071 B 6/2012

*Primary Examiner* — Abu Zar Ghaffari
(74) *Attorney, Agent, or Firm* — David M. Quinn; Brian F. Russell

(57) ABSTRACT

A data processing system includes multiple processing units all having access to a shared memory. A processing unit includes a lower level cache memory and a processor core coupled to the lower level cache memory. The processor core includes an execution unit for executing instructions in a plurality of simultaneous hardware threads, an upper level cache memory, and a plurality of wait flags each associated with a respective one of the plurality of simultaneous hardware threads. The processor core is configured to set a wait flag among the plurality of wait flags to indicate the associated hardware thread is in a wait state in which the hardware thread suspends instruction execution and to exit the wait state based on the wait flag being reset.

16 Claims, 13 Drawing Sheets

(56) References Cited

U.S. PATENT DOCUMENTS

| | | |
|---|---|---|
| RE40,989 E | 11/2009 | Jain et al. |
| 7,853,756 B2 * | 12/2010 | Ukai .................. G06F 9/3004 |
| | | 711/152 |
| 8,296,519 B2 | 10/2012 | Guthrie et al. |
| 8,539,485 B2 | 9/2013 | Snyder et al. |
| 8,640,129 B2 * | 1/2014 | Cismas .................. G06F 9/463 |
| | | 718/100 |
| 8,949,539 B2 | 2/2015 | Blumrich et al. |
| 9,239,742 B2 * | 1/2016 | Liu ........................ G06F 9/544 |
| 9,268,722 B1 * | 2/2016 | Perozo ................ G06F 13/1663 |
| 9,390,015 B2 | 7/2016 | Johns |
| 9,390,026 B2 | 7/2016 | Guthrie et al. |
| 9,396,127 B2 | 7/2016 | Guthrie et al. |
| 9,430,166 B2 | 8/2016 | Frey et al. |
| 2006/0053326 A1 * | 3/2006 | Naveh .................. G06F 1/3203 |
| | | 713/323 |
| 2006/0136919 A1 | 6/2006 | Aingaran et al. |
| 2007/0220211 A1 | 9/2007 | Johns |
| 2009/0172284 A1 * | 7/2009 | Offen .................... G06F 12/084 |
| | | 711/125 |
| 2011/0154079 A1 * | 6/2011 | Dixon .................. G06F 1/3206 |
| | | 713/323 |
| 2012/0137115 A1 * | 5/2012 | Fiandino ................ G06F 30/33 |
| | | 713/2 |
| 2012/0304815 A1 | 12/2012 | Yagi |
| 2014/0331029 A1 * | 11/2014 | Foo ...................... G06F 9/522 |
| | | 712/208 |
| 2016/0283374 A1 * | 9/2016 | Pal ........................ G06F 12/084 |
| 2017/0091090 A1 * | 3/2017 | Wang .................... G06F 12/126 |
| 2017/0177483 A1 * | 6/2017 | Vinod .................. G06F 12/0815 |
| 2017/0228233 A1 * | 8/2017 | Mishaeli ............... G06F 9/3009 |
| 2018/0308209 A1 * | 10/2018 | Ramadoss ............ G06F 9/4881 |
| 2019/0004958 A1 * | 1/2019 | Vasudevan ............ G06F 3/068 |
| 2019/0347125 A1 * | 11/2019 | Sankaran ................. G06F 9/48 |

* cited by examiner

200 loop:
```
larx r1, var      ~202
add r1, 1         ~204
stcx var, r1      ~206
beq loop          ~208
```

FIG. 2A

210 loop:
```
load r1, lock     ~220  ⎫
cmp r1, 1         ~222  ⎬ 212
beq loop          ~224  ⎭ larx r1, lock     ~230  ⎫
cmp r1, 1         ~232  ⎪
beq loop          ~234  ⎬ 214
li r2, 1          ~236  ⎪
stcx lock, r2     ~238  ⎪
beq loop          ~239  ⎭ barrier           ~240  ⎫
...               ~242  ⎬ 216
(critical section       ⎪
instructions)           ⎪
...                     ⎪
barrier           ~244  ⎭ li r2, 0          ~250  ⎫
store lock, r2    ~252  ⎬ 218
```

FIG. 2B

270 loop:
```
larx flag         ~274  ⎫
cmp flag, 1       ~276  ⎪
beq exit          ~278  ⎬ 272
waitrsv           ~280  ⎪
br loop           ~282  ⎭
```
exit:

FIG. 2C

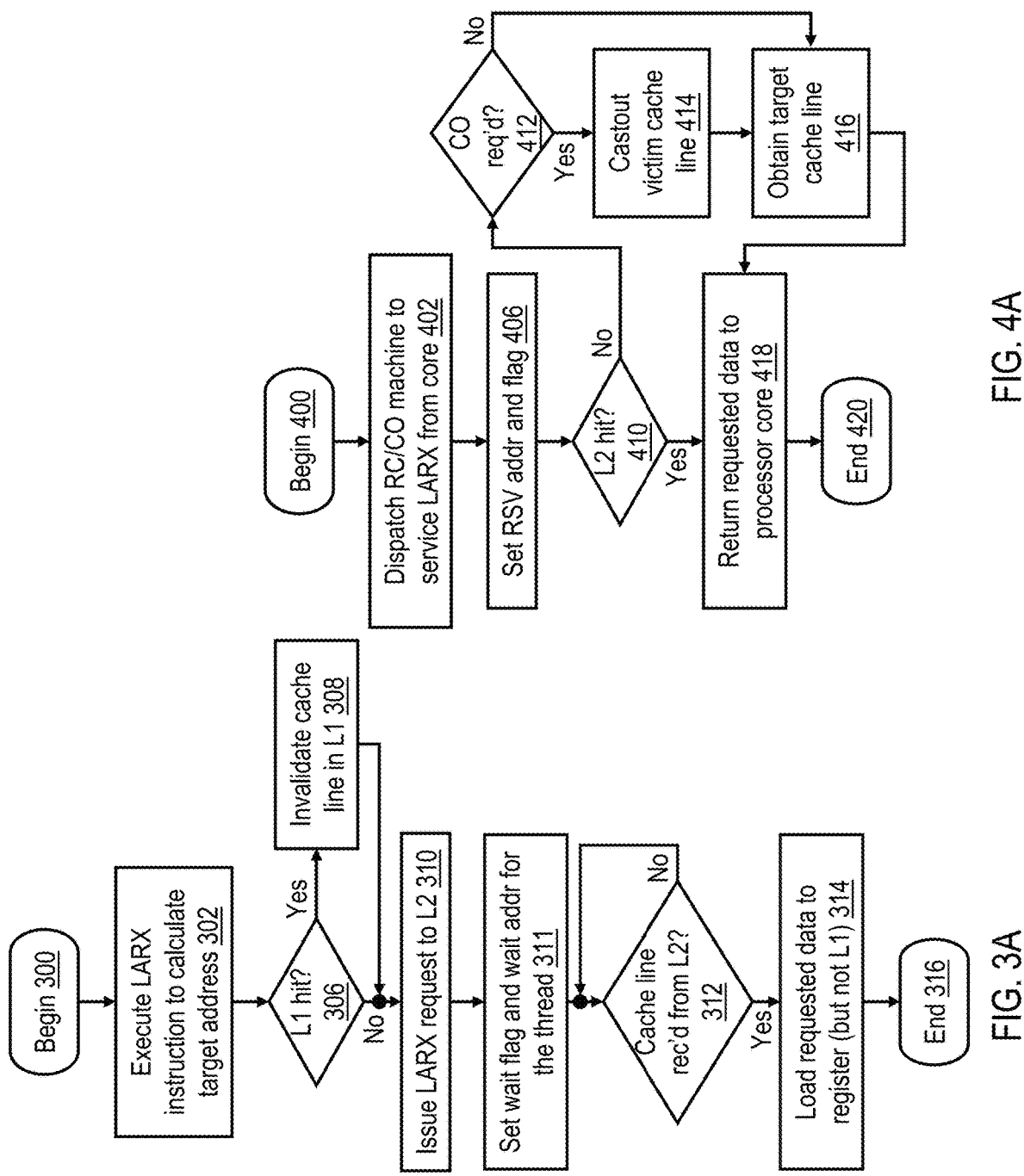

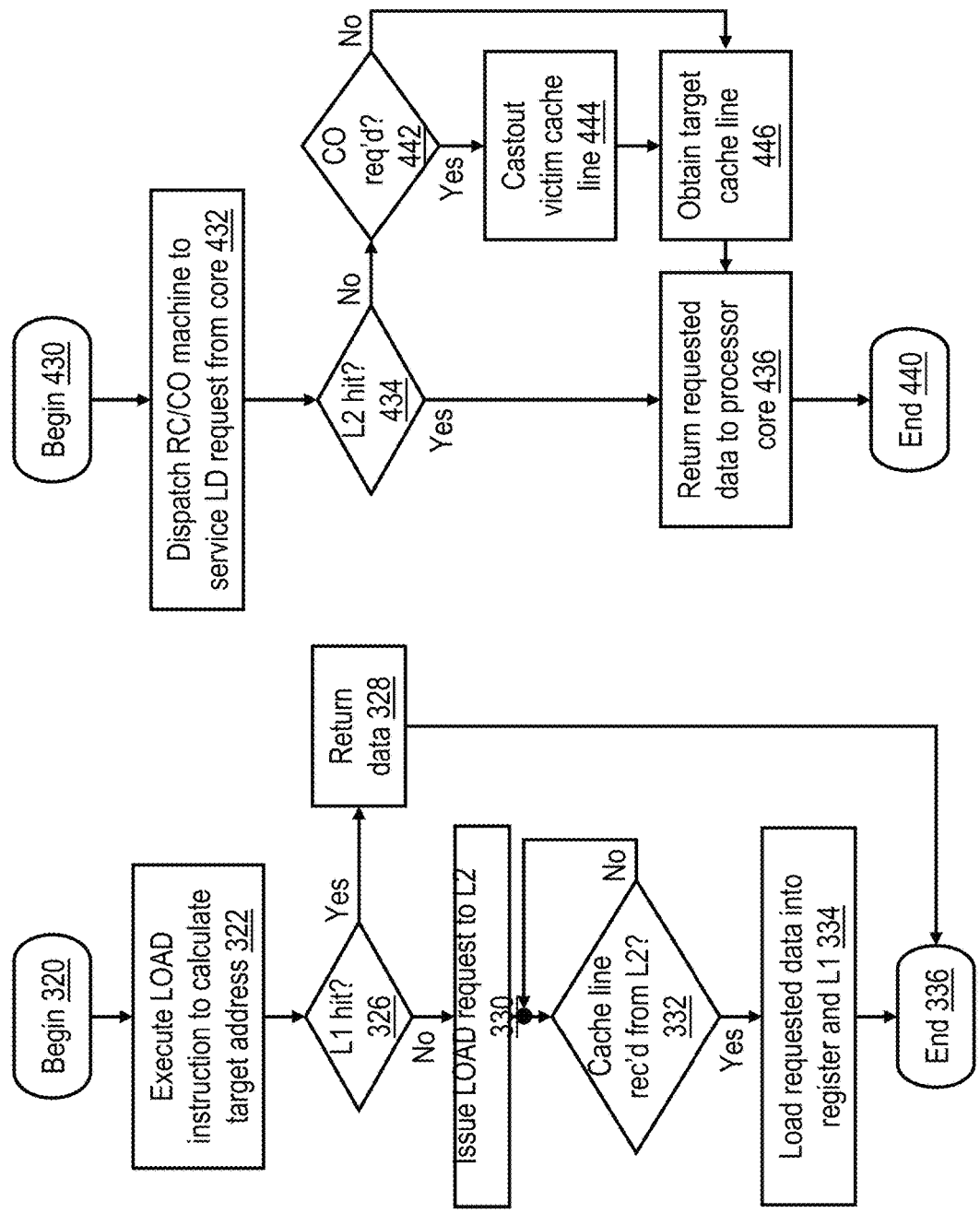

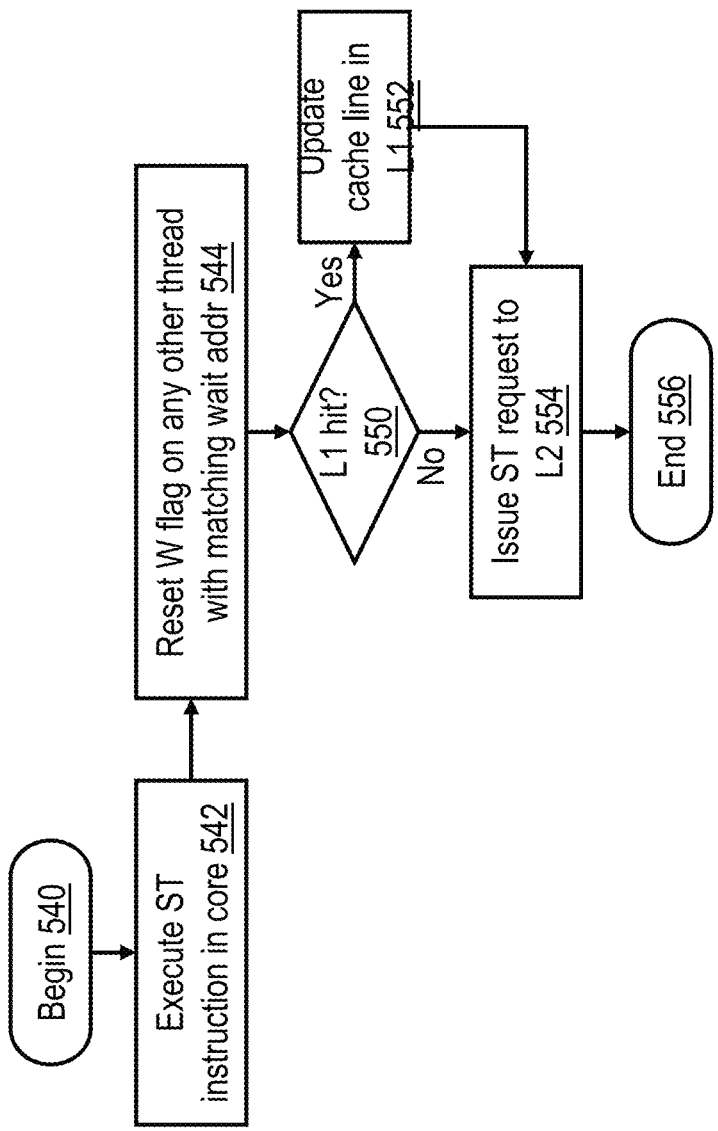

US 11,086,672 B2

LOW LATENCY MANAGEMENT OF PROCESSOR CORE WAIT STATE

BACKGROUND OF THE INVENTION

The present invention relates in general to data processing system and, in particular, to managing accesses to data in shared memory of a data processing system. Still more particularly, the present invention relates to a processor, data processing system and method providing low latency management of a wait state of a hardware thread in a processor core.

In shared memory multiprocessor (MP) data processing systems, each hardware thread of the multiple processors in the system may access and modify data stored in the shared memory. In order to synchronize access to a particular granule of memory (e.g., a lock or other variable) between multiple processing units and hardware threads of execution, load-reserve and store-conditional instruction pairs are often employed. For example, load-reserve and store-conditional instructions have been implemented in the POWER® instruction set architecture with request codes (opcodes) associated with various mnemonics, referred to herein generally as LARX (load-and-reserve) and STCX (store-conditional). The goal of load-reserve and store-conditional instruction pairs is to load and modify data and then to commit the modified data to coherent memory only if no other hardware thread of execution has modified the data in the interval between the load-reserve and store-conditional instructions. Thus, a read-modify-write operation targeting shared memory can be emulated without the use of an atomic update primitive that directly enforces atomicity.

When a hardware thread is competing to acquire a lock held by another hardware thread, it is common for the hardware thread seeking to acquire the lock to simply execute in a programming loop (i.e., to "spin") in which the hardware thread repeatedly checks whether or not the lock is in an unlocked state. In some cases, this programming loop employs a load-reserve instruction to test the lock state; in other cases a regular load instruction is utilized. In either case, because the hardware thread remains active but is not performing a useful task while "spinning" on the lock in this manner, some prior art processor architectures support the ability for the hardware thread waiting to acquire the lock to instead enter a suspend or wait state until the lock is unlocked. By placing the thread in a wait state, the consumption of power and processor resources associated with "spinning" on the lock is reduced.

BRIEF SUMMARY

The present disclosure appreciates that in prior art architectures it is common for the availability of a lock (or other variable to which access is sought) to be determined at a point of coherence residing at a lower level of the vertical cache hierarchy associated with a processor core. Consequently, management of a hardware thread entering a wait (or suspend) state based on the variable being unavailable and exiting the wait (or suspend) state based on the variable potentially becoming available entails communication between the processor core and the point of coherence. This communication increases latency and consumes some of the limited bandwidth of the request communication paths coupling the processor core and the lower level cache(s). Accordingly, the present disclosure appreciates that it would be desirable to reduce such communication by supporting management of thread wait states within the processor core through implementation of per-thread wait flags.

According to at least one embodiment, a data processing system includes multiple processing units all having access to a shared memory. A processing unit includes a lower level cache memory and a processor core coupled to the lower level cache memory. The processor core includes an execution unit for executing instructions in a plurality of simultaneous hardware threads, an upper level cache memory, and a plurality of wait flags each associated with a respective one of the plurality of simultaneous hardware threads. The processor core is configured to set a wait flag among the plurality of wait flags to indicate the associated hardware thread is in a wait state in which the hardware thread suspends instruction execution and to exit the wait state based on the wait flag being reset.

BRIEF DESCRIPTION OF THE SEVERAL VIEWS OF THE DRAWINGS

FIG. 2A depicts a first exemplary instruction sequence that employs load-reserve and store-conditional instructions to synchronize access to shared memory;

FIG. 2B illustrates a second exemplary instruction sequence that employs load-reserve and store-conditional instructions to coordinate execution of a critical section of a multithreaded program;

FIG. 2C illustrates an instruction sequence in which a hardware thread enters a wait state if a flag does not have a predetermined value;

FIG. 3A is a high level logical flowchart of an exemplary method of processing a load-reserve instruction in a processor core in accordance with one embodiment;

FIG. 3B is a high level logical flowchart of an exemplary method of processing a load instruction in a processor core in accordance with one embodiment;

FIG. 4A is a high level logical flowchart of an exemplary method of processing a load-reserve request in a lower level cache in accordance with one embodiment;

FIG. 4B is a high level logical flowchart of an exemplary method of processing a load request in a lower level cache in accordance with one embodiment;

FIG. 5B is a high level logical flowchart of an exemplary method of processing a store instruction in a processor core in accordance with one embodiment;

DETAILED DESCRIPTION

Figure 1A:
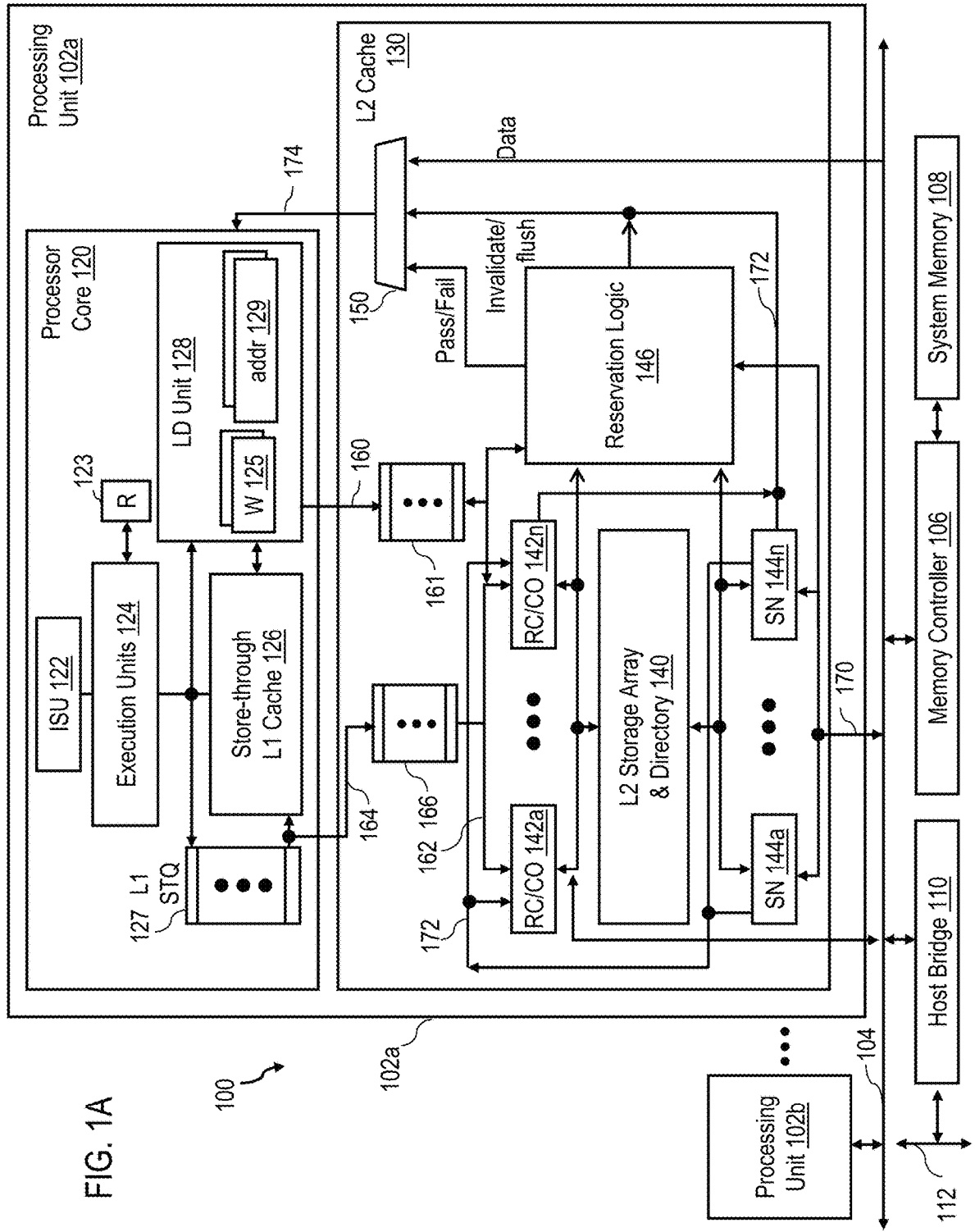
FIG. 1A is a high level block diagram of an illustrative data processing system in accordance with one embodiment.

With reference now to the figures and in particular with reference to FIG. 1A, there is illustrated a high level block diagram of a data processing system 100 in accordance with one embodiment. As shown, data processing system 100 includes multiple processing units 102 (including at least processing units 102a-102b) for processing data and instructions. Processing units 102 are coupled for communication to a system interconnect 104 for conveying address, data and control information between attached devices. In the depicted embodiment, these attached devices include not only processing units 102, but also a memory controller 106 providing an interface to a shared system memory 108 and one or more host bridges 110, each providing an interface to a respective mezzanine bus 112. Mezzanine bus 112 in turn provides slots for the attachment of additional unillustrated devices, which may include network interface cards, I/O adapters, non-volatile memory, non-volatile storage device adapters, additional bus bridges, etc.

As further illustrated in FIG. 1A, each processing unit 102, which may be realized as a single integrated circuit, includes one or more processor cores 120 (of which only one is explicitly shown) for processing instructions and data. Each processor core 120 includes an instruction sequencing unit (ISU) 122 for fetching and ordering instructions for execution, one or more execution units 124 for executing instructions dispatched from ISU 122, and a set of registers 123 for temporarily buffering data and control information. The instructions executed by execution units 124 include load-reserve and store-conditional instructions, which are utilized to synchronize access to shared memory between a particular thread of execution and other concurrent threads of execution, whether executing in the same processor core 120, a different processor core 120 in the same processing unit 102, or in a different processing unit 102. In a preferred embodiment, execution units 124 execute at least load-reserve and store-conditional instructions in-order (other instructions may or may not be executed out-of-order).

Each processor core 120 further includes an L1 store queue (STQ) 127 and a load unit 128 for managing the completion of store and load requests, respectively, corresponding to executed store and load instructions (including load-reserve and store-conditional instructions). In a preferred embodiment, L1 STQ 127 is implemented as a First-In, First-Out (FIFO) queue containing a plurality of queue entries. Store requests are accordingly loaded in the "top" entry of L1 STQ 127 at execution of the corresponding store instruction to determine the target address, and are initiated when the store request reaches the "bottom" or "commit" entry of L1 STQ 127. In the depicted embodiment, load unit 128 includes, for each of multiple simultaneous hardware threads of execution, a respective wait flag 125 indicating whether execution of the hardware thread is temporarily suspended while awaiting availability of a variable. Thus, for example, if the wait flag 125 is set, execution of the associated hardware thread is suspended, and if the wait flag 125 is reset, execution of the associated hardware thread is not suspended. Each wait flag 125 has a respective address register 129 indicating the cache line address of the variable, if any, upon which the hardware thread is waiting.

It is important to note that the present application makes a distinction between "instructions", such as load-reserve and store-conditional instructions, and "requests." Load and store "instructions" (including load-reserve and store-conditional instructions) are defined herein as inputs to an execution unit that include an request code (opcode) identifying the type of instruction and one or more operands specifying data to be accessed and/or its address. Load and store "requests," including load-reserve and store-conditional requests, are defined herein as data and/or signals generated following instruction execution that specify at least the target address of data to be accessed. Thus, load-reserve and store-conditional requests may be transmitted from a processor core 120 to the shared memory system to initiate data accesses, while load-reserve and store-conditional instructions are not.

The operation of processor core 120 is supported by a multi-level volatile memory hierarchy having, at its lowest level, shared system memory 108, and at its upper levels two or more levels of cache memory, which in the illustrative embodiment include a L1 cache 126 and a L2 cache 130. As in other shared memory multiprocessor data processing systems, the contents of the memory hierarchy may generally be accessed and modified by threads of execution executing in any processor core 120 in any processing unit 102 of data processing system 100.

In accordance with one embodiment, L1 cache 126, which may include bifurcated L1 data and instruction caches, is implemented as a store-through cache, meaning that the point of cache coherency with respect to other processor cores 120 is located below L1 cache 126 and, in the depicted embodiment, is located at store-in L2 cache 130. Accordingly, as described above, L1 cache 126 does not maintain true cache coherency states (e.g., Modified, Exclusive, Shared, Invalid) for its cache lines, but only maintains valid/invalid bits. Because L1 cache 126 is implemented as a store-through cache, store requests first complete relative to the associated processor core 120 in L1 cache 126 and then complete relative to other processing units 102 at a point of system-wide coherency, which in the depicted embodiment is L2 cache 130.

As further illustrated in FIG. 1A, L2 cache 130 contains a storage array and directory 140 that store cache lines of instructions and data in association with their respective memory addresses and coherence states. L2 cache 130 also includes a number of read-claim (RC)/Castout (CO) state machines 142a-142n for independently and concurrently servicing memory access requests received from the associated processor cores 120. RC/CO machines 142 receive core load requests from LD unit 128 in processor core 120 via load bus 160, an in-order L2 load queue (LDQ) 161, and command bus 162. Similarly, RC/CO machines 142 receive core store requests from L1 STQ 127 in processor core 120 via store bus 164, an in-order L2 store queue (STQ) 166, and command bus 162. RC/CO machines 142 also handle castouts of data from L2 storage array 140 to system memory 108, as necessary.

L2 cache 130 further includes a number of snoop (SN) state machines 144a-144n for servicing memory access and other requests received from other processing units 102 via system interconnect 104 and snoop bus 170. SN machines 144 and RC/CO machines 142 are each connected to a back-invalidation bus 172 by which any SN machine 144 or RC/CO machine 142 can signal the invalidation of a cache line to processor core 120.

It is important to note that in a preferred embodiment L2 cache 130 is constructed such that at most a single one of RC/CO machines 142 and SN machines 144 can be active servicing a request targeting a given target cache line address at any one time. Consequently, if a second request is received while a first request targeting the same cache line is already being serviced by an active RC/CO machine 142 or SN machine 144, the later-in-time second request must be queued or rejected until servicing of the first request is completed and the active state machine returns to an idle state.

L2 cache 130 finally includes reservation logic 146 for recording reservations of the associated processor core 120. An exemplary embodiment of reservation logic 146 is described in greater detail below with reference to FIG. 1B. As shown, reservation logic 146 provides pass and fail indications indicating the success or failure of store-conditional (STCX) requests of the associated processor core 120. These pass/fail indications, as well as invalidation commands of RC/CO machines 142 and SN machines 144 on back-invalidation bus 172 and data received on system interconnect 104, are received as inputs by a multiplexer 150. Multiplexer 150 orders these various inputs for transmission to processor core 120 via reload bus 174.

Those skilled in the art will additionally appreciate that data processing system 100 of FIG. 1A can include many additional non-illustrated components, such as interconnect bridges, non-volatile storage, ports for connection to networks or attached devices, etc. Because such additional components are not necessary for an understanding of the described embodiments, they are not illustrated in FIG. 1A or discussed further herein. It should also be understood, however, that the enhancements described herein are applicable to cache coherent data processing systems of diverse architectures and are in no way limited to the generalized data processing system architecture illustrated in FIG. 1A.

Figure 1B:
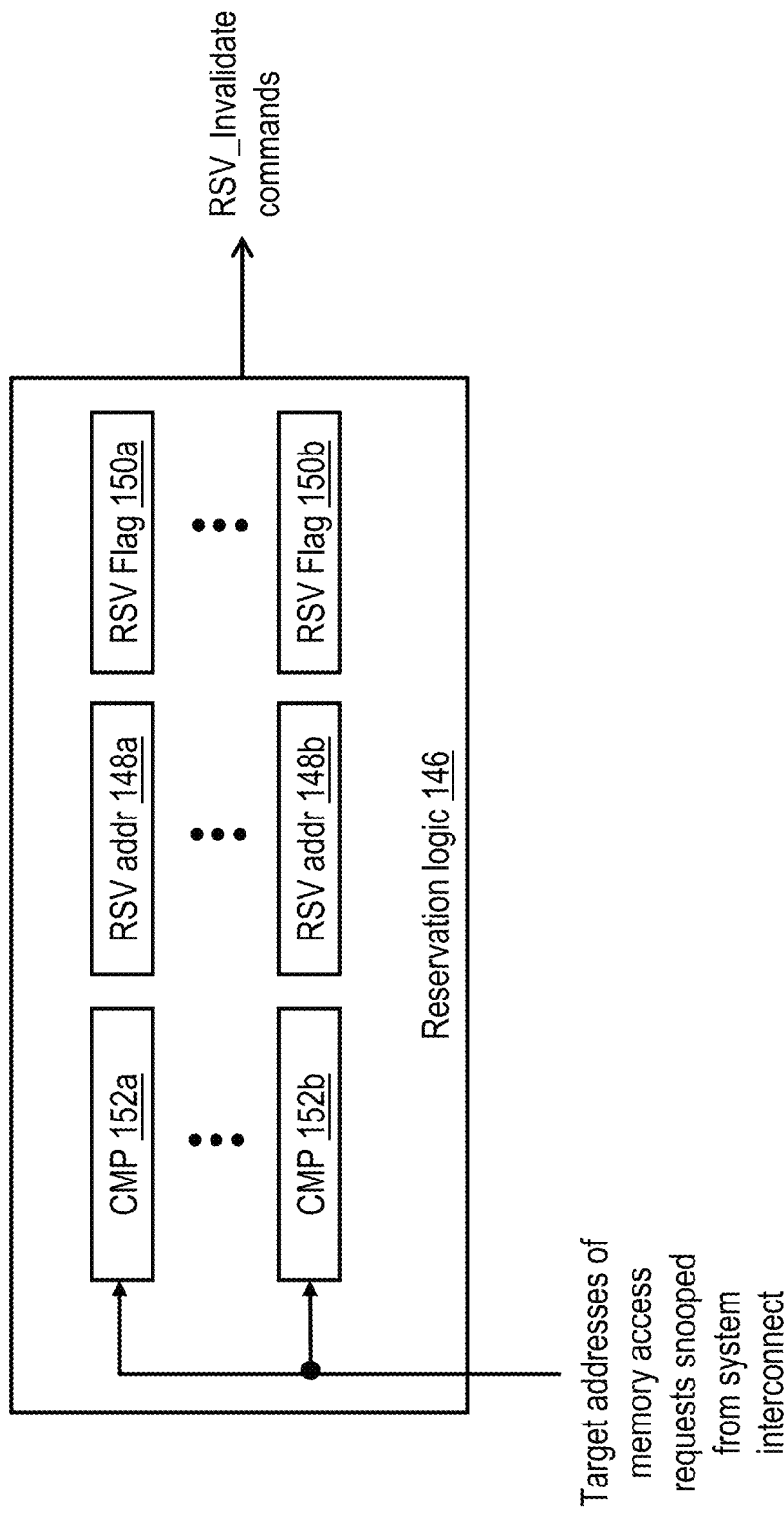
FIG. 1B is a more detailed view of the reservation logic of FIG. 1A in accordance with one embodiment.

Referring now to FIG. 1B, there is depicted a more detailed block diagram of reservation logic 146 of FIG. 1 in accordance with one embodiment. In the illustrated embodiment, reservation logic 146 includes, for each hardware thread that may be concurrently executed by the associated processor core 120, a respective reservation register comprising a reservation address field 148 and a reservation flag 150. In the depicted example, which assumes that processor core 120 can each execute two concurrent hardware threads, reservation logic 146 includes two reservation registers: reservation address field 148a and reservation flag 150a for thread 0 and reservation address field 148b and reservation flag 150b for thread 1. When set (e.g., to '1'), a reservation flag 150 indicates that the corresponding thread holds a reservation for the address contained in the associated reservation address field 148 and otherwise indicates no reservation is held.

Reservation logic 146 additionally includes per-thread comparators 152a-152b. As described further below, comparators 152 receive target addresses of memory access requests snooped from system interconnect 104 and compare the target addresses with the reservation addresses, if any, specified in reservation address fields 148. In response to detection of an address match, reservation logic 146 resets the associated reservation flag 150 and issues a RSV_Invalidate command for the applicable hardware thread to the processor core 120.

Referring now to FIG. 2A, there is depicted a first exemplary instruction sequence 200 that employs load-reserve and store-conditional instructions to synchronize access to shared memory. In particular, instruction sequence 200 is utilized to update the value of a variable in shared memory.

Instruction sequence 200 begins with a LARX instruction 202 that loads the value of the variable (i.e., var) from shared memory into a private register r1 in the processor core executing the instruction. The value of the variable is then updated locally in register r1, in this case, by an ADD instruction 204 incrementing the value of the variable by 1. The new value of the variable is then conditionally stored back into shared memory by STCX instruction 206. The success or failure of STCX instruction 206 in updating the value of the variable in shared memory is reflected in a condition code register (e.g., one of registers 123) in the processor core. Conditional branch instruction 208 then tests the condition code found in the condition code register and conditionally redirects execution based on the success or failure of STCX instruction 206. If the relevant bit(s) of the condition code register is/are equal to zero, indicating that the conditional update to the variable indicated by STCX instruction 206 failed (e.g., due to an intervening storage-modifying access to the variable by another thread between execution of LARX instruction 202 and STCX instruction 208), instruction sequence 200 will be repeated, and execution branches from conditional branch instruction 208 back to LARX instruction 202. If, however, the conditional update indicated by STCX instruction 206 succeeds, the condition code will be non-zero, and processing will continue with the next sequential instruction following instruction sequence 200.

With reference now to FIG. 2B, there is illustrated a second exemplary instruction sequence 210 that employs load-reserve and store-conditional instructions to coordinate execution of a critical section of a multithreaded program. As indicated, instruction sequence 210 includes, in program order, a polling instruction sequence 212, lock acquisition sequence 214, critical section 216, and lock release sequence 218.

As is known in the art, critical section 216 is, by definition, a portion of a program that includes accesses to a shared resource (e.g., a shared in-memory data set) that must not be concurrently accessed by more than one thread of the multiprocessor program. In order to keep the various hardware threads from making concurrent accesses to the shared resource, the multithreaded program bounds critical section 206 with barrier instructions 240, 244 that order execution of instructions within critical section 216 with respect to both instructions in the same thread that are outside critical section 216. In addition, the multiprocessor program ensures that not more than one thread at a time enters into a critical section by implementing a lock to which access is synchronized by load-reserve and store-conditional instructions.

In particular, a thread attempts to acquire the lock needed to enter critical section 216 through execution of lock acquisition sequence 214. Lock acquisition sequence 214 begins with a LARX instruction 230 that loads the value of the lock variable (i.e., lock) from shared memory into a private register r1 (e.g., one of registers 123) in the executing processor core. The value of the lock variable is then tested by compare instruction 232 to determine whether or not the lock is currently in a locked state (i.e., the lock is held by another thread). If so, conditional branch instruction 234 causes execution to return to the beginning of polling instruction sequence 212 (which is described in greater detail below). If a determination that the lock is not currently held by another thread, a LOAD immediate instruction 236 places a value of '1' (representing a locked state) into a register r2. A STCX instruction 238 then conditionally updates the lock variable in shared memory to the locked state, thus securing the lock for the executing thread. As before, the success or failure of the STCX instruction in updating the value of the lock variable in shared memory is reflected in a condition code register in the processor core. Conditional branch instruction 239 tests the condition code found in the condition code register and conditionally redirects execution based on the success or failure of STCX instruction 238. If the relevant bit(s) of the condition code register is/are equal to zero, indicating that the conditional update to the lock variable indicated by STCX instruction 238 failed (e.g., due to an intervening storage-modifying access to the lock variable by another thread between execution of LARX instruction 230 and STCX instruction 238), instruction sequence 210 will be repeated from the beginning of instruction polling sequence 212. If, however, the conditional update to the lock variable indicated by STCX instruction 238 succeeds, the condition code will be non-zero, and processing will proceed sequentially to critical section 216. Once critical section 216 completes, the thread will release the lock by updating the lock variable in shared memory by executing a lock release sequence 218 including a LOAD immediate instruction 250 that loads register r2 with a value of '0' (representing an unlocked state) and a STORE instruction 252 that updates the lock variable in shared memory with this value. Thereafter, execution of the thread proceeds to subsequent instructions, if any.

Although a multiprocessor program could be implemented with only lock acquisition sequence 214, critical section 216, and lock release sequence 218 (i.e., omitting polling instruction sequence 212), in practice such a multiprocessor program would not efficiently utilize the resources of a processing unit, such as a processing unit 102 in FIG. 1A. In particular, LARX instruction 230, which is utilized to load the lock value and set the reservation for the lock address upon which the execution of STCX instruction 238 depends, is generally a resource-intensive instruction. Irrespective of the chosen implementation of the cache hierarchy, a LARX instruction requires communication with the coherence point of the cache hierarchy, and in implementations in which that the coherence point is not in the L1 cache, this communication results in the LARX instruction being more resource-intensive than a corresponding LOAD instruction. For example, in the current embodiment, regardless of whether the target address of LARX instruction 230 hits or misses in L1 cache 126, execution of LARX instruction 230 requires allocation of an entry in L2 LDQ 161, dispatch of an RC/CO machine 142 in L2 cache 130, and update of reservation logic 146. Consequently, it is desirable that the thread iterate on a load target address using a less resource-intensive LOAD instruction rather than a more resource-intensive a LARX instruction.

Therefore, it is common for lock acquisition sequence 214 to be proceeded by a polling instruction sequence 212. Polling instruction sequence 212, which is constructed very similarly to the beginning of lock acquisition sequence 214, includes a polling LOAD instruction 220 (rather than a LARX instruction) that loads the lock value from shared memory, a compare instruction 222 that compares the lock value to a value of '1' (indicating a locked state), and a conditional branch instruction 224 that returns execution back to polling LOAD instruction 220 until the lock is found to be in the unlocked state. It is advantageous to employ polling LOAD instruction 220 to poll on the lock variable rather than a LARX instruction since a hit on the target address of polling LOAD instruction 220 in L1 cache 126 will not require utilization of any of the limited resources of L2 cache 130 (e.g., L2 LDQ 161, RC/CO machines 142, and reservation logic 146).

In multithreaded programs that include instruction sequences such as instruction sequences 200 and 210, it is common for a hardware thread to execute multiple STCX instructions targeting the same store target address. For example, in the multithreaded program including instruction sequence 210, a hardware thread may need to acquire the same lock multiple times in order to execute various different critical sections of code. Because the target cache lines identified by STCX requests are commonly highly contended, it is not uncommon for these cache lines to bounce back and forth between the caches of various processing units, leading to significant traffic on the system interconnect and execution inefficiency due to the conditional updates to shared memory indicated by the STCX requests being attempted multiple times prior to succeeding.

As an alternative to conventional polling instruction sequence such as polling instruction sequence 212, a program can enter a wait state instead of continuing to iteratively execute a polling loop. Referring now to FIG. 2C, there is depicted an exemplary polling instruction sequence 270 including a polling loop 272 in which a hardware thread enters a wait state if a flag does not have a predetermined value. In this example, polling loop 272 includes a polling LARX instruction 274 that loads a flag value from shared memory, a compare instruction 276 that compares the flag value to a predetermined value (e.g., '1'), and a conditional branch instruction 278 that exits polling instruction sequence 272 if the flag is found to have the predetermined value. If conditional branch instruction 278 determines that the flag does not have the predetermined value, execution of the hardware thread proceeds to WAITRSV instruction 280, which causes the executing hardware thread to enter a wait (suspend) state if the flag is still set when WAITRSV instruction 280 is executed. As will be appreciated, while in the wait state, the executing hardware thread does not consume power or resources of its processing unit 102. Once the flag is updated or due to other conditions, the executing hardware thread exits the wait state, and unconditional branch instruction 282 is executed to return execution to LARX instruction 274. LARX instruction 274 causes the executing processor core to load the updated value of the flag, and compare instruction 276 causes the processor core to test whether the flag has been updated to the predetermined state. If so, conditional branch instruction 278 will cause the executing hardware thread to exit polling loop 272; if not, the executing hardware thread will again enter the wait state in response to execution of WAITRSV instruction 280.

As noted above, in conventional system architectures, the determination associated with wait WAITRSV instruction 280 of whether the flag had been updated (and thus whether the executing hardware thread can exit the wait state) is made at the point of coherence. Because the point of coherence is commonly implemented at a lower level of the vertical cache memory hierarchy supporting the processor core, this determination incurs non-negligible communication latency between the processor core and the lower level of the vertical cache hierarchy and consumes bandwidth on the data paths communicating requests of the processor core to the lower level of the vertical cache hierarchy. However, according to the disclosed embodiments, this latency and the consumption of core-to-cache bandwidth are reduced through the implementation of wait flags 125 with the processor core 120. As discussed below in greater detail, the wait flag 125 of a hardware thread of a processor core 120 is set when the hardware thread enters into a wait state, and the hardware thread exits the wait state based on its associated wait flag 125 being reset among other conditions, as described below.

With reference now to FIG. 3A, there is depicted a high level logical flowchart of an exemplary method by which a processor core 120 of data processing system 100 processes a load-reserve (LARX) instruction in accordance with one embodiment. As shown, the process begins at block 300 and thereafter proceeds to block 302, which illustrates execution units 124 receiving a LARX instruction from ISU 122 and then executing the LARX instruction to calculate the load target address. In a preferred embodiment, execution units 124 execute LARX instructions within a hardware thread in-order and without pipelining, meaning that the data words(s) requested by a LARX instruction must be loaded to one or more registers 123 in processor core 120 before the next LARX or STCX instruction begins execution. These restrictions simplify the management of reservations by reservation logic 146 in L2 cache 130.

Following execution of the LARX instruction, an indication of the instruction type, a thread identifier, and the load target address calculated by execution of the LARX instruction are received from execution units 124 by LD unit 128. At block 306, LD unit 128 determines whether or not the load target address of the LARX instruction resides in L1 cache 126. If so, LD unit 128 invalidates the cache line containing the load target address in L1 cache 126 (block 308). Those skilled in the art should appreciate that the invalidation of the cache line containing the load target address in L1 cache 126 is a simplifying design choice and that in other embodiments the cache line containing the load target address need not be invalidated in L1 cache 126. Following block 308 or in response to determining that the load target address of the LARX instruction missed in L1 cache 126, LD unit 128 issues a LARX request to L2 cache 130 via load bus 160 (block 310). The LARX request includes, for example, an indication of the request type, the load target address, and an identifier of the issuing thread. After buffering the LARX request in L2 LDQ 161, L2 cache 130 dispatches the LARX request to an RC/CO machine 142 for servicing, as described further below with reference to FIG. 4A. As indicated at block 311, LD unit 128 also sets the wait flag 125 associated with the requesting hardware thread and places the load target address (or a portion thereof) in the associated address register 129.

Next, at block 312, LD unit 128 awaits return of the requested cache line identified by the load target address from L2 cache 130. In response to receipt of the requested cache line, LD unit 128 transfers the data word(s) associated with the load target address into a core register 123, but does not cache the requested cache line in L1 cache 126 (block 314). It should be appreciated that in an alternative embodiment that does not invalidate the requested cache line at block 308, the requested cache line can instead be cached in L1 cache 126 to permit subsequent loads (including subsequent load-reserve requests), to hit in L1 cache 126. Following block 314, the process of FIG. 3A terminates at block 316.

Referring now to FIG. 4A, there is depicted a high level logical flowchart of an exemplary method by which an L2 cache 130 of data processing system 100 processes a load-reserve (LARX) request in accordance with one embodiment. The process begins at block 400 and then proceeds to block 402, which depicts L2 cache 126 dispatching an RC/CO machine 142 to service a next LARX request of the associated processor core 120 that is enqueued in L2 LDQ 161. As illustrated at block 406, RC/CO machine 142 establishes a reservation for the load target address in L2 cache 130 in the reservation register of the appropriate thread by placing the load target address in the appropriate reservation address field 148 and setting the associated reservation flag 150.

At block 410, RC/CO machine 142 additionally determines whether or not the load target address of the LARX request hit in L2 storage array and directory 140. If so, the process passes directly to block 418. If not, RC/CO machine 142 determines whether or not a castout (CO) is required to accommodate the cache line associated with the load target address within L2 storage array and directory 140 (block 412). If not, the process passes to block 416, which is described below. If, however, RC/CO machine 142 determines at block 412 that a castout is required, RC/CO machine 142 casts out a victim cache line from the relevant congruence class of L2 storage array and directory 140 (block 414). At block 416, RC/CO machine 142 also issues one or more requests on system interconnect 104 in order to obtain a copy of the cache line associated with the load target address from another cache hierarchy or system memory 108. Following block 416, the process proceeds to block 418, which depicts RC/CO machine 142 returning the requested cache line to the associated processor core 120. Thereafter, the RC/CO machine 142 servicing the LARX request transitions from the busy state to the idle state, and the process of FIG. 4A ends at block 420.

With reference now to FIG. 3B, there is illustrated a high level logical flowchart of an exemplary method of processing a load instruction in a processor core 120 of data processing system 100 in accordance with one embodiment. As shown, the process begins at block 320 and thereafter proceeds to block 322, which illustrates execution units 124 receiving a LOAD instruction from ISU 122 and then executing the LOAD instruction to calculate the load target address. Following execution of the LOAD instruction, an indication of the instruction type, a thread identifier, and the load target address calculated by execution of the LOAD instruction are received from execution units 124 by LD unit 128. At block 326, LD unit 128 determines whether or not the load target address of the LOAD instruction resides in L1 cache 126. If so, LD unit 128 returns the relevant data words of the target cache line associated with the load target address from L1 cache 126 to one of registers 123 (block 328). Thereafter, the process of FIG. 3B ends at block 336.

Returning to block 326, in response to determining that the load target address of the LOAD instruction missed in L1 cache 126, LD unit 128 issues a LOAD request to L2 cache 130 via load bus 160 (block 330). The LOAD request includes, for example, an indication of the request type, the load target address, and an identifier of the issuing thread. After buffering the LOAD request in L2 LDQ 161, L2 cache 130 dispatches the LOAD request to an RC/CO machine 142 for servicing, as described further below with reference to FIG. 4B. Next, at block 332, LD unit 128 awaits return of the requested cache line identified by the load target address from L2 cache 130. In response to receipt of the requested cache line, LD unit 128 transfers the data word(s) associated with the load target address into a core register 123 and caches the requested cache line in L1 cache 126 (block 334). Following block 334, the process of FIG. 3B terminates at block 336.

Referring now to FIG. 4B, there is depicted a high level logical flowchart of an exemplary method by which an L2 cache 130 of data processing system 100 processes a load request in accordance with one embodiment. The process begins at block 430 and then proceeds to block 432, which depicts L2 cache 126 dispatching an RC/CO machine 142 to service a next LOAD request of the associated processor core 120 that is enqueued in L2 LDQ 161. At block 434, RC/CO machine 142 determines whether or not the load target address of the LOAD request hit in L2 storage array and directory 140. If so, the process passes directly to block 436. If not, RC/CO machine 142 determines whether or not a castout (CO) is required to accommodate the cache line associated with the load target address within L2 storage array and directory 140 (block 442). If not, the process passes to block 446, which is described below. If, however, RC/CO machine 142 determines at block 442 that a castout is required, RC/CO machine 142 casts out a victim cache line from the relevant congruence class of L2 storage array and directory 140 (block 444). At block 446, RC/CO machine 142 also issues one or more requests on system interconnect 104 in order to obtain a copy of the cache line associated with the load target address from another cache hierarchy or system memory 108. Following block 446, the process proceeds to block 436, which depicts RC/CO machine 142 returning the requested cache line to the associated processor core 120. Thereafter, the RC/CO machine 142 servicing the LARX request transitions from the busy state to the idle state, and the process of FIG. 4B ends at block 440.

Figure 5A:
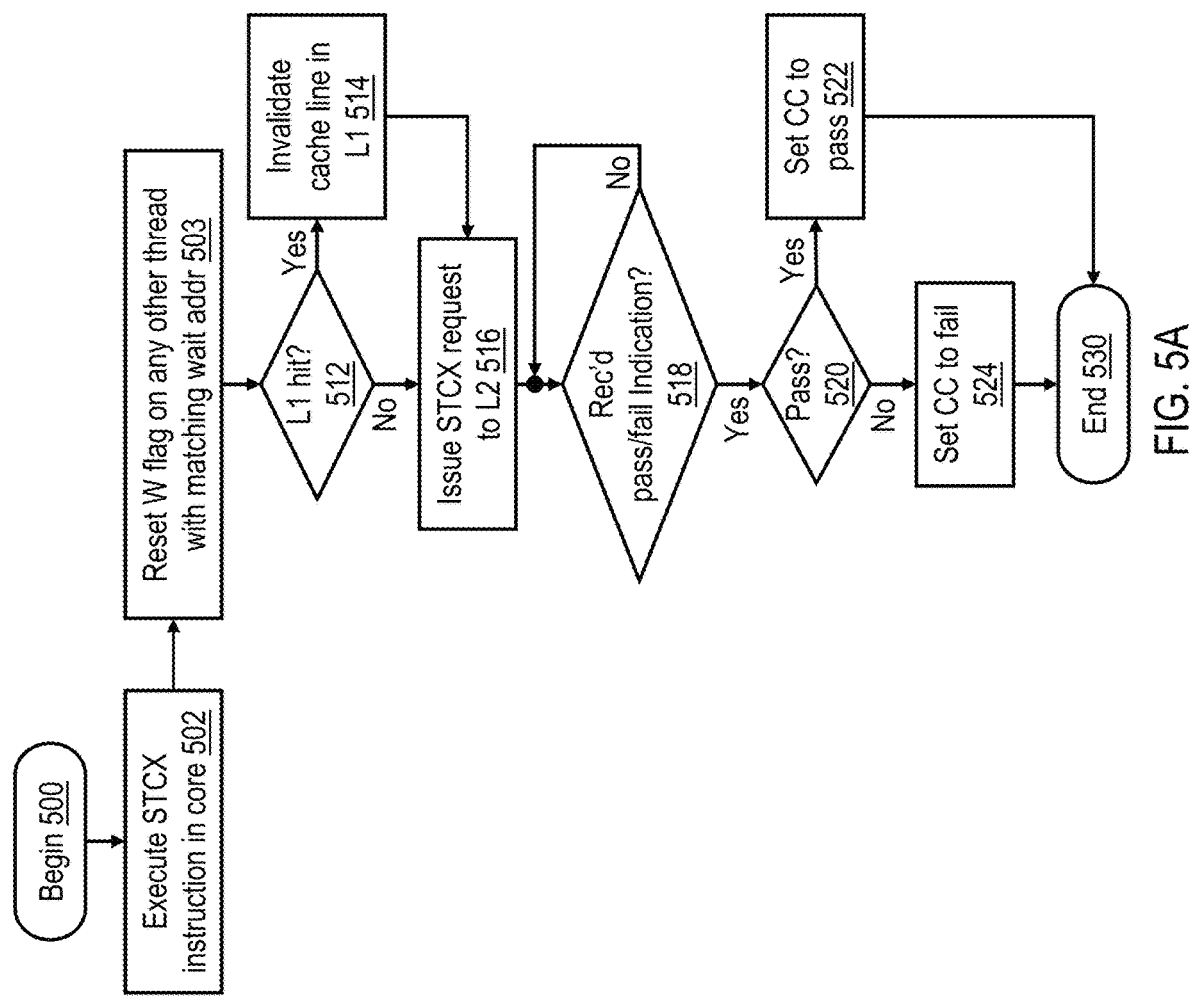
FIG. 5A is a high level logical flowchart of an exemplary method of processing a store-conditional instruction in a processor core in accordance with one embodiment.

With reference now to FIG. 5A, there is illustrated a high level logical flowchart of an exemplary method of processing a store-conditional (STCX) instruction in a processor core 120 of data processing system 100 in accordance with one embodiment. As depicted, the process begins at block 500 and thereafter proceeds to block 502, which illustrates execution units 124 receiving a STCX instruction from ISU 122 and then executing the store-type instruction to calculate a store target address. As with the LARX execution described above, execution units 124 also preferably execute STCX instructions appearing in the same hardware thread in-order and without pipelining with respect to both LARX and STCX instructions.

Upon execution of the STCX instruction, execution units 124 reset the wait flag 125 associated with any other hardware thread (i.e., not the hardware thread including the STCX instruction) for which the address register 129 contains an address matching the store target address. It will be appreciated that this reset of wait flag(s) 125 is optimistic in that the STCX may not succeed in updating the flag, as discussed below with reference to block 520. An alternative pessimistic implementation would reset the wait flag(s) 125 only after the STCX has been determined to succeed. Following execution of the STCX instruction, execution units 124 also place a corresponding store-type request including the store target address calculated by execution of the STCX instruction, a thread identifier, and the store data specified by the operands of the STCX instruction within L1 STQ 127. In one preferred embodiment, L1 STQ 127 is implemented as a shared FIFO queue that buffers and orders store requests of all threads executing within processor unit 102. When the STCX request corresponding to the executed STCX instruction reaches the bottom or commit entry of L1 STQ 127, L1 STQ 127 determines at block 512 whether or not the store target address of the STCX request hits in L1 cache 126. If so, L1 STQ 127 invalidates the target cache line held in L1 cache 126 (block 514). Following block 514 or in response to the store target address missing in L1 cache 126 at block 512, L1 STQ 127 issues the STCX request to L2 STQ 166 of L2 cache 130 via store bus 164 (block 516). L1 STQ 127 then awaits return via pass/fail bus 174 of a pass or fail indication for the STCX request indicating whether or not the STCX request succeeded in updating L2 cache 130 (block 518). In response to receipt of the pass or fail indication via pass/fail bus 174, processor core 120 provides the pass or fail indication to execution units 124 (e.g., to indicate whether the path of execution should change) and, as shown at block 520-524, updates a condition code register among registers 123 to indicate whether the STCX request passed or failed. Thereafter, the STCX request is deallocated from L1 STQ 127, and the process of FIG. 5A terminates at block 530.

Figure 6A:
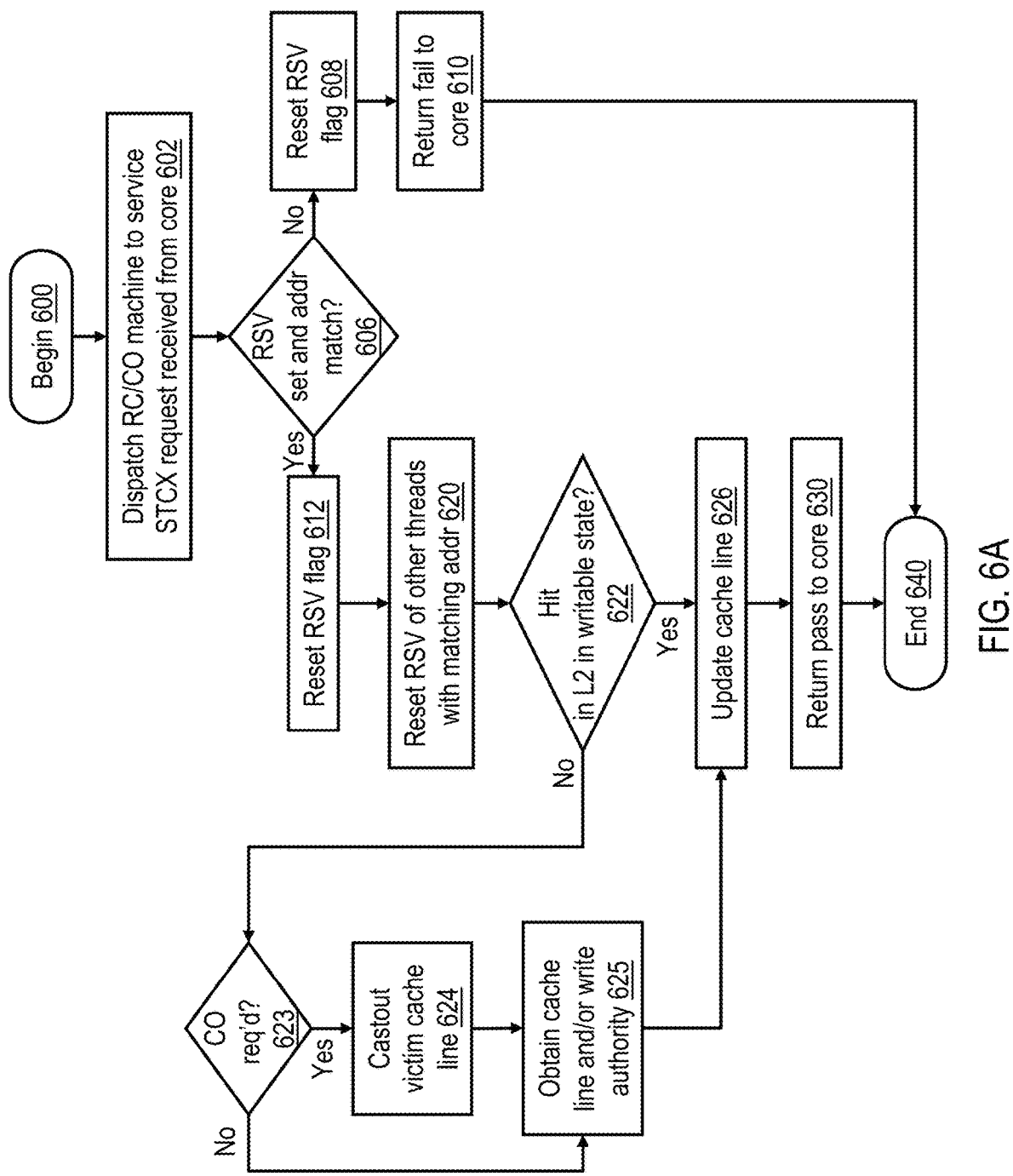
FIG. 6A is a high level logical flowchart of an exemplary method of processing a store-conditional request in lower level cache in accordance with one embodiment.

Referring now to FIG. 6A, there is depicted a high level logical flowchart of an exemplary method of processing a store-conditional (STCX) request in a lower level cache in accordance with one embodiment. As described above, STCX requests are received by L2 cache 130 within L2 STQ 166 via store bus 164. In some embodiments, L2 STQ 166 may be implemented, like L1 STQ 127, as a FIFO queue. In such embodiments, the process begins at block 600 in response to receipt of a STCX request in the bottom entry of L2 STQ 166. The STCX request at the bottom entry of L2 STQ 166 will then be selected for dispatch to an idle RC/CO machine 142 for processing, as shown at block 602.

In response to receipt of a STCX request for servicing, the dispatched RC/CO machine 142 transitions from an idle state to the busy state. While in the busy state, the RC/CO machine 142 protects the store target address of the STCX request against any conflicting access to the same store target address executing on another hardware thread of the same processing unit 102 or a different processing unit 102. The process of FIG. 6A proceeds from block 602 to block 606, which illustrates the RC/CO machine 142 determining whether or not the issuing thread has a valid reservation for the store target address by determining whether the thread's RSV flag 150 is set and the associated RSV register 148 specifies a reservation address matching the store target address. If not, RC/CO machine 142 resets the RSV flag 150 of the issuing thread (block 608) and returns a fail indication to the processor core 120 via pass/fail bus 174 to report that the STCX request made no update to L2 cache 130 (block 610). Thereafter, the RC/CO machine 142 allocated to service the STCX request returns to the idle state, and the process of FIG. 6A ends at block 640.

Returning to block 606, in response to RC/CO machine 142 determining that the issuing thread has a valid reservation for the store target address of the STCX request, RC/CO machine 142 resets the issuing thread's RSV flag 150 (block 612), as well as the RSV flag 150 of any other thread specifying a matching store target address in its associated RSV address register 148 (block 620). It should be noted that in this exemplary embodiment a STCX request only cancels the reservations of other threads at block 620 after it is verified at block 606 that the STCX is going to succeed in its conditional update of shared memory.

The process proceeds from block 620 to block 622, which illustrates RC/CO machine 142 determining whether or not the store target address of the STCX request hits in L2 storage array and directory 140 in a "writeable" coherence state that confers authority on L2 cache 130 to modify the target cache line. If not, RC/CO machine 142 determines whether or not a castout (CO) is required to accommodate the target cache line associated with the store target address within L2 storage array and directory 140 (block 623). If not, the process passes to block 625, which is described below. If, however, RC/CO machine 142 determines at block 623 that a castout is required, RC/CO machine 142 casts out a victim cache line from the relevant congruence class of L2 storage array and directory 140 (block 624). At block 625, RC/CO machine 142 also obtains authority to modify the target cache line and, if necessary, a copy of the target cache line from another cache hierarchy or memory controller 106 by issuing one or more requests on system interconnect 104. Following block 625 or in response to an affirmative determination at block 622, RC/CO machine 142 updates the target cache line in L2 storage array and directory 140 with the store data of the store-type request (block 626). RC/CO machine 142 additionally returns a pass indication to processor core 120 via pass/fail bus 174 to report successful update of the L2 cache 130 (block 630). Thereafter, RC/CO machine 142 returns to the idle state, and the process of FIG. 6A ends at block 640.

With reference now to FIG. 5B, there is illustrated a high level logical flowchart of an exemplary method of processing a store instruction in a processor core 120 of data processing system 100 in accordance with one embodiment. As depicted, the process begins at block 540 and thereafter proceeds to block 542, which illustrates execution units 124 receiving a store-type instruction from ISU 122 and then executing the store-type instruction to calculate a store target address.

Upon execution of the store instruction, execution units 124 reset the wait flag 125 associated with any other hardware thread (i.e., not the hardware thread including the store instruction) for which the address register 129 contains an address matching the store target address (block 544). Execution units 124 also place a corresponding store-type request including the store target address calculated by execution of the store-type instruction, a thread identifier, and the store data specified by the operands of the store-type instruction within L1 STQ 127. In one preferred embodiment, L1 STQ 127 is implemented as a shared FIFO queue that buffers and orders store requests of all threads executing within processor unit 102. When the STORE request corresponding to the executed store-type instruction reaches the bottom or commit entry of L1 STQ 127, L1 STQ 127 determines at block 550 whether or not the store target address of the STORE request hits in L1 cache 126. If so, L1 STQ 127 updates the target cache line held in L1 cache 126 with the store data (block 552). Following block 552 or in response to the store target address missing in L1 cache 126 at block 550, L1 STQ 127 issues the STORE request to L2 STQ 166 of L2 cache 130 via store bus 164 (block 554). Thereafter, the STORE request is deallocated from L1 STQ 127, and the process of FIG. 5B terminates at block 556.

Figure 6B:
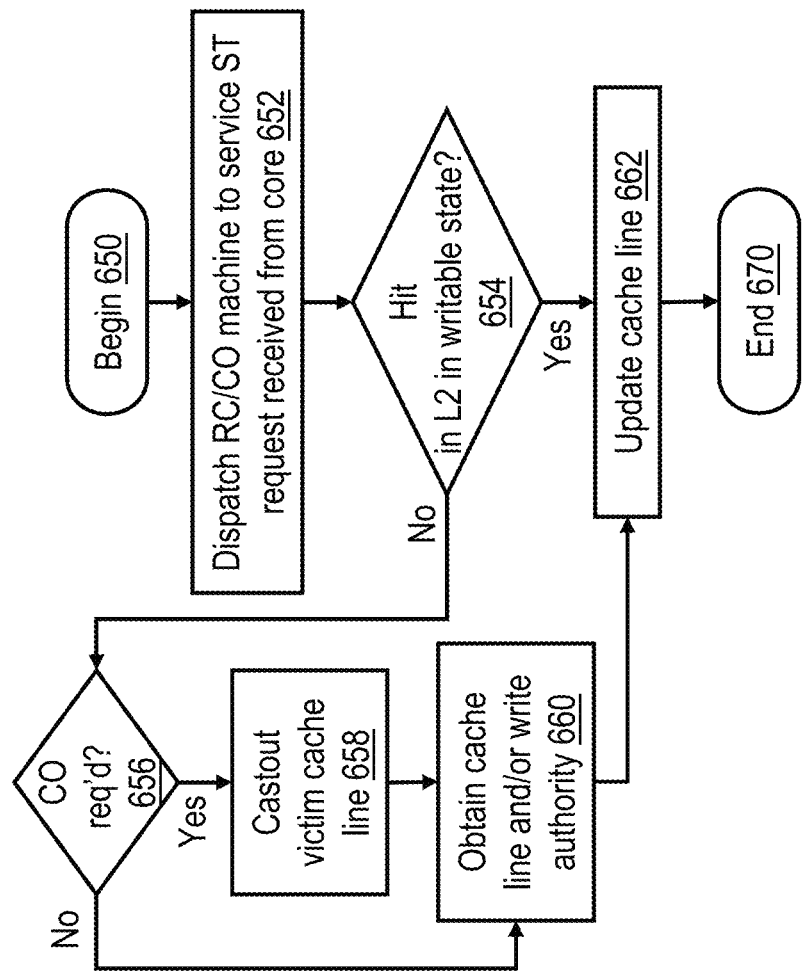
FIG. 6B is a high level logical flowchart of an exemplary method of processing a store request in lower level cache in accordance with one embodiment.

Referring now to FIG. 6B, there is illustrated a high level logical flowchart of an exemplary method of processing a store request in lower level cache in accordance with one embodiment. As described above, in data processing system 100, STORE requests are received by L2 cache 130 within L2 STQ 166 via store bus 164. In some embodiments, L2 STQ 166 may be implemented, like L1 STQ 127, as a FIFO queue. In such embodiments, the process begins at block 650 in response to receipt of a STORE request in the bottom entry of L2 STQ 166. The STORE request at the bottom entry of L2 STQ 166 will then be selected for dispatch to an idle RC/CO machine 142 for processing, as shown at block 652.

In response to receipt of a STORE request for servicing, the dispatched RC/CO machine 142 transitions from an idle state to the busy state. While in the busy state, the RC/CO machine 142 protects the store target address of the STCX request against any conflicting access to the same store target address executing on another hardware thread of the same processing unit 102 or a different processing unit 102. The process of FIG. 6B proceeds from block 652 to block 654, which illustrates the RC/CO machine 142 determining whether or not the store target address of the STORE request hits in L2 storage array and directory 140 in a "writeable" coherence state that confers authority on L2 cache 130 to modify the target cache line. If not, RC/CO machine 142 determines whether or not a castout (CO) is required to accommodate the target cache line associated with the store target address within L2 storage array and directory 140 (block 656). If not, the process passes to block 660, which is described below. If, however, RC/CO machine 142 determines at block 656 that a castout is required, RC/CO machine 142 casts out a victim cache line from the relevant congruence class of L2 storage array and directory 140 (block 658). At block 660, RC/CO machine 142 also obtains authority to modify the target cache line and, if necessary, a copy of the target cache line from another cache hierarchy or memory controller 106 by issuing one or more requests on system interconnect 104. Following block 660 or in response to an affirmative determination at block 654, RC/CO machine 142 updates the target cache line in L2 storage array and directory 140 with the store data of the STORE request (block 662). Thereafter, RC/CO machine 142 returns to the idle state, and the process of FIG. 6B ends at block 670.

Figure 7:
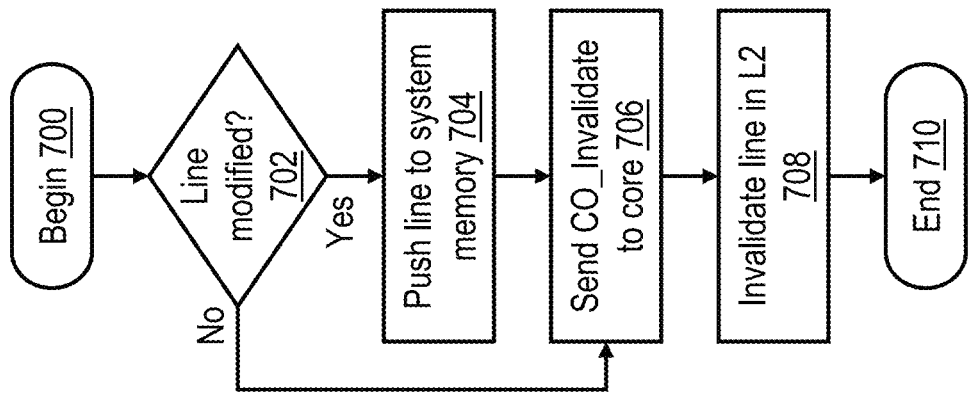
FIG. 7 is a high level logical flowchart of an exemplary method of casting out a line from a lower level cache in accordance with one embodiment.

With reference to FIG. 7, there is illustrated a high level logical flowchart of an exemplary method of casting out a line from a lower level cache (e.g., L2 cache 130) in accordance with one embodiment. The illustrated process, which is performed, for example, at blocks 414, 444, 624, and 658, begins at block 700 and then proceeds to block 702. At block 702, the RC/CO machine 142 dispatched to service the castout determines whether or not the victim cache line to be castout is modified with respect to system memory 108, for example, by reference to the coherence state associated with the victim cache line in the L2 directory. If not, the process passes to block 706, which is described below. If, however, RC/CO machine 142 determines at block 702 that the victim cache line is modified, RC/CO machine 142 issues a memory write request on system interconnect 104 to update the corresponding memory block within system memory 108 with the modified data contained in the victim cache line (block 704). In addition, at block 706, the RC/CO machine 142 sends a CO_Invalidate command identifying the victim cache line to processor core 120 via reload bus 174. RC/CO machine 142 also invalidates the victim cache line in L2 storage array and directory 140 (block 708). Thereafter, the castout process presented in FIG. 7 ends at block 710.

Figure 8B:
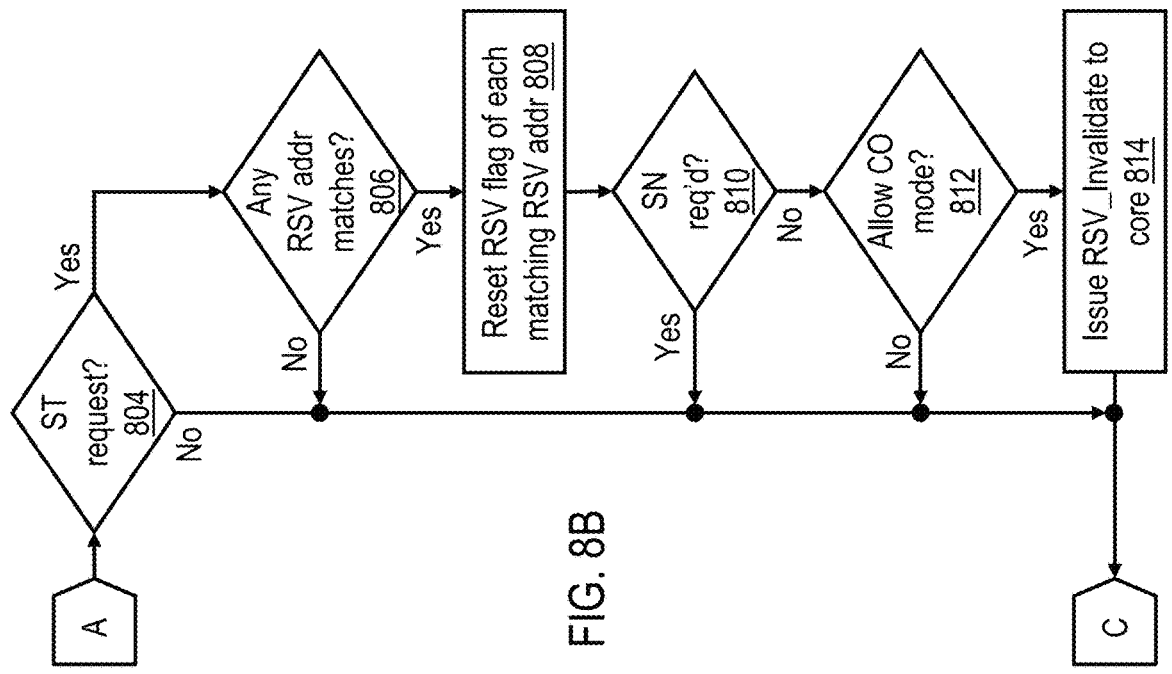
FIGS. 8A-8C together form a high level logical flowchart of an exemplary method of processing a snooped request in accordance with one embodiment.
Figure 8A:
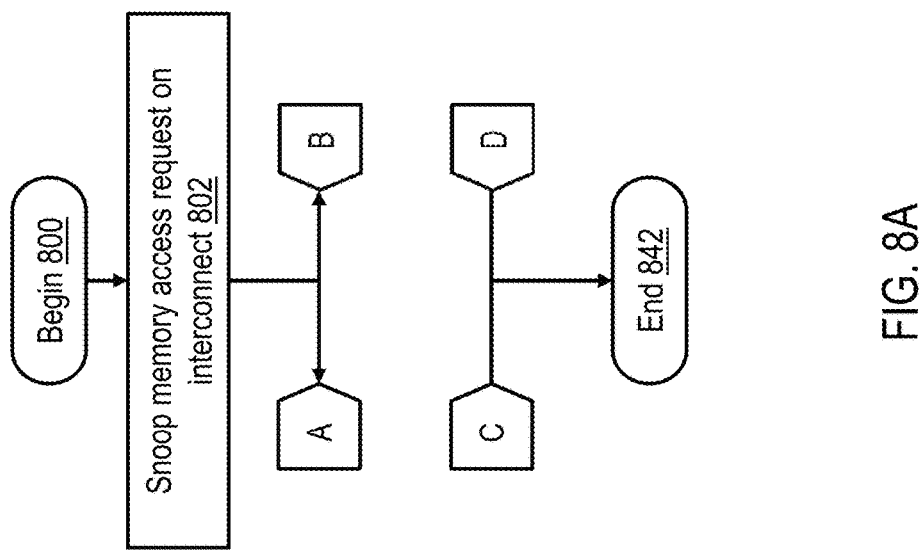
Figure 8C:
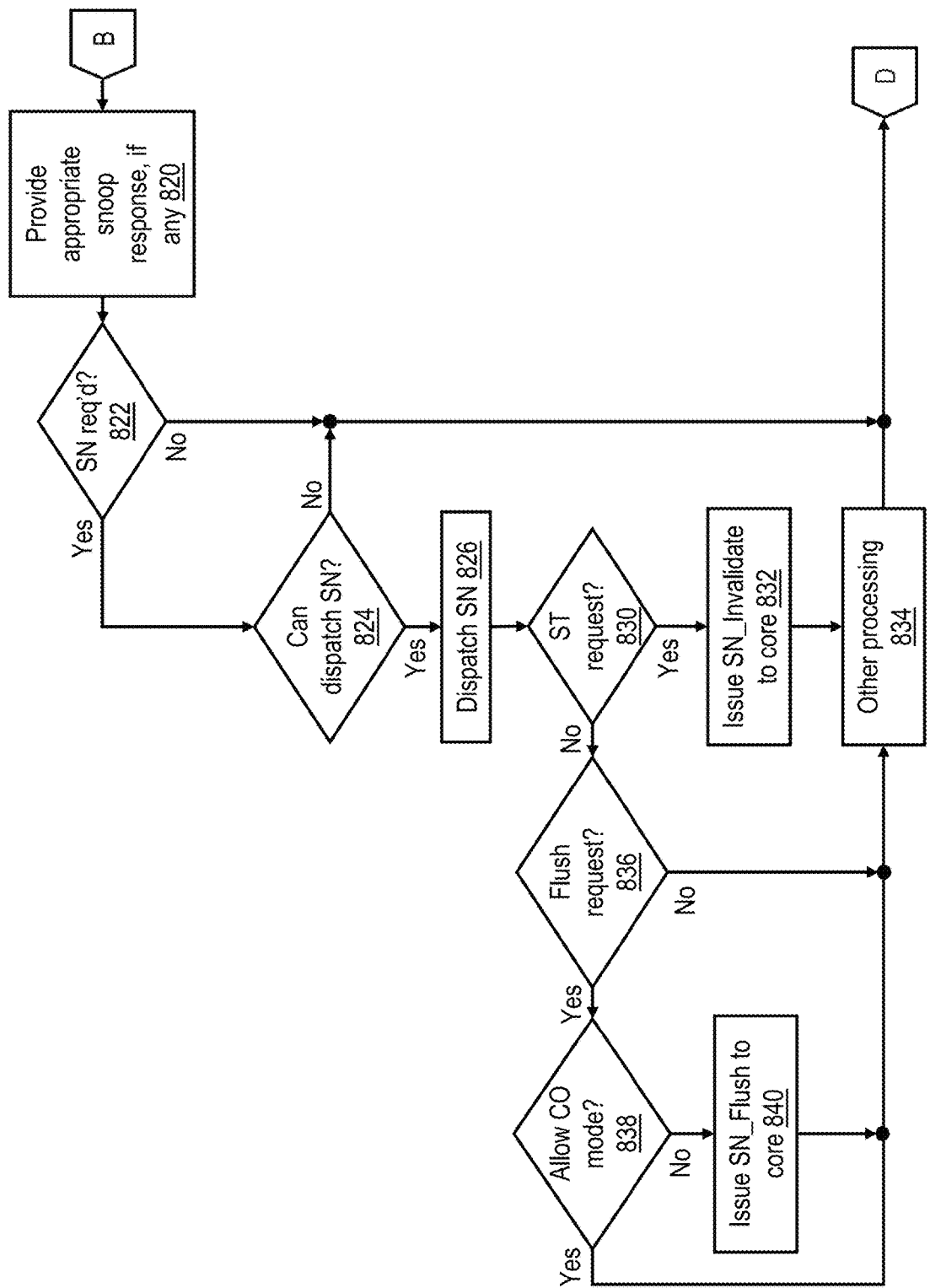

Referring now to FIGS. 8A-8C, there is depicted a high level logical flowchart of an exemplary method by which a processing unit 102 of data processing system 100 processes a request snooped on system interconnect 104 in accordance with one embodiment. The process begins at block 800 of FIG. 8A and then proceeds to block 802, which illustrates a processing unit 102 snooping a memory access request on system interconnect 104. Following block 802, the process bifurcates and proceeds through page connector A to FIG. 8B, which depicts processing the snooped request with respect to the reservations recorded in reservation logic 146, and additionally proceeds through page connector B to FIG. 8C, which illustrates performing any required processing to service the snooped request. After the processing depicted in both FIGS. 8B-8C completes, the process returns to FIG. 8A via page connectors C and D and terminates at block 842.

Referring now to FIG. 8B, the process begins at page connector A and then proceeds to block 804, which illustrates reservation logic 146 determining whether or not the memory access request snooped on interconnect logic 104 is a store-type request that entails an update to a memory block. If not, the process proceeds directly to page connector C and returns to FIG. 8A. If, however, reservation logic 146 determines at block 804 that the snooped memory access request is a store-type request, reservation logic 146 determines utilizing comparators 152 whether or not the target address specified by the snooped request matches any of the reservation address recorded in reservation address fields 148 (block 806). If not, the process passes to page connector C. If, however, a match is detected between the target address of the snooped memory access request and one or more of the reservation addresses recorded in reservation address field 148, reservation logic 146 cancels the relevant reservation(s) by resetting the reservation flag 150 of each reservation register storing a matching reservation address (block 808).

Reservation logic 146 also determines whether or not a SN machine 144 will be dispatched to service the snooped memory access request (block 810). If so, the SN machine 144 will handle the transmission of any required invalidation commands to the processor core, as described below with reference to FIG. 8C. Consequently, the process passes to page connector C. If, however, reservation logic determines at block 810 that no SN machine 144 will be dispatched to service the snooped memory access request (e.g., the snooped memory access request is a Kill request that simply invalidates any cached copy of the target cache line), reservation logic 146 further determines at block 812 whether or not processing unit 102 is configured to permit a hardware thread of processor core 102 to remain in a wait state despite the castout or invalidation from L2 storage array and directory 140 of the cache line containing the flag on which a hardware thread was awaiting an update. If reservation logic 146 determines at block 812 that processing unit 102 is not configured to permit a hardware thread of processor core 102 to remain in a wait state despite the castout or invalidation from L2 storage array and directory 140 of the cache line upon which the wait state depends, the process passes to page connector C. Otherwise, reservation logic 146 issues a RSV_Invalidate command to the processor core 102 via reload bus 174 (block 814). Thereafter, the process returns to FIG. 8A via page connector C.

Turning now to FIG. 8C, the process begins at block connector B and then proceeds to block 820, which depicts L2 cache 130 providing a snoop response for the snooped memory access request in accordance with the snoop-based coherence protocol implemented by data processing system 100. In general, this snoop response is determined based on the coherence state, if any, for the target cache line of the snooped memory access request recorded in L2 storage array and directory 140. In addition at block 822, L2 cache 130 determines at block 822 whether or not a SN machine 144 needs to be dispatched to service the snooped memory access request. In general, L2 cache 130 determines that a SN machine 144 needs to be dispatched if (1) the target address specified in the snooped memory access request hits in L2 storage array and directory 140 in a valid coherence state and (2) the snooped memory access request requests a copy of the target cache line or write authority for the target cache line identified by the target address. In response to a determination at block 822 that no SN machine 144 need be dispatched to service the snooped memory access request, the process passes to page connector D.

Returning to block 822, in response to a determination that dispatch of a SN machine 144 is required to service the snooped memory access request, L2 cache 130 determines at block 824 whether or not it is able to dispatch a SN machine 144 to service the snooped memory access request (e.g., SN machine 144 is then in an idle state and no other RC/CO machine 142 or SN machine 144 is busy servicing a memory access request specifying a conflicting target address). If not, the process passes to page connector D. If, however, L2 cache 130 determines at block 824 that it is able to dispatch a SN machine 144 to service the snooped memory access request, L2 cache 130 dispatches an idle SN machine 144 to service the snooped memory access request at block 826.

At block 830, the SN machine 144 dispatched to service the snooped memory access request determines whether or not the snooped memory access request is a store-type request that indicates an update to the target cache line. If so, SN machine 144 issues a SN_Invalidate command to processor core 102 (block 832) and performs other processing to service the store-type request, such as updating L2 storage array and directory 140 to invalidate the target cache line of the snooped memory access request, sourcing a copy of the target cache line via cache-to-cache intervention, etc. (block 834).

If, however, SN machine 144 determines at block 830 that the snooped memory access request is not a store-type request, SN machine 144 additionally determines at block 836 if the snooped memory access request is a flush request, which causes any modified data to be written to system memory 108 and the target cache line to be invalidated. A flush does not cause a reservation to be canceled because no update of shared memory occurs; instead, the cache line is only transferred back to system memory. If not, meaning that the snooped memory access request is some type of a read request, SN machine performs the processing, if any, necessary to service the read request (block 834), which can include, for example, updating L2 storage array and directory 140 and/or sourcing a copy of the target cache line via cache-to-cache intervention.

In response to a determination at block 836 that the snooped memory access request is a flush request, SN machine 144 further determines at block 838 whether or not processing unit 102 is configured to permit a hardware thread of processor core 102 to remain in a wait state despite the castout or invalidation from L2 storage array and directory 140 of the cache line containing the flag on which the hardware thread was awaiting an update. If so, the process passes directly to block 834. If not, SN machine 144 issues a SN_Flush command specifying the target address to the processor core 120 via reload bus 174. The process then passes to block 834, which depicts SN machine 144 servicing the snooped flush request, for example, by writing any modified data to system memory 108 and then invalidating the target cache line in L2 storage array and directory 140. Following block 834, the process returns to FIG. 8A via page connector D and ends at block 842.

Figure 9:
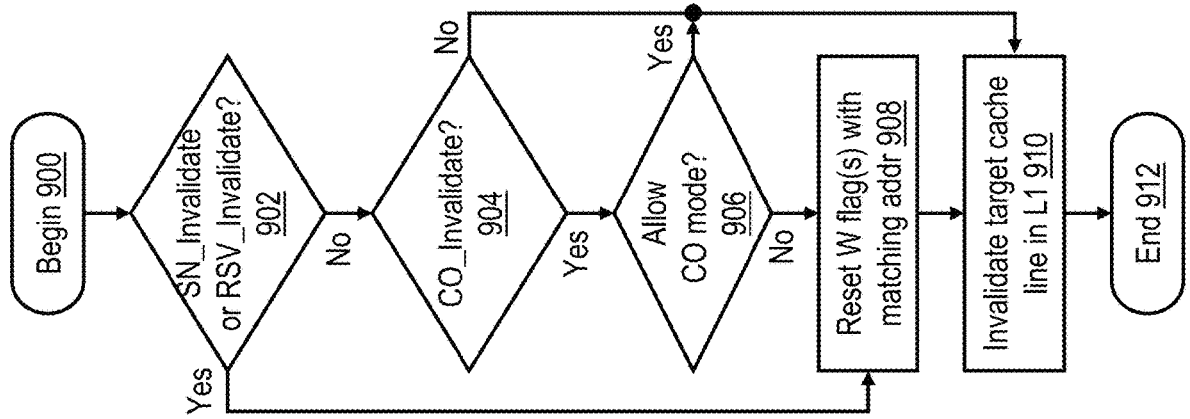
FIG. 9 is a high level logical flowchart of an exemplary method of processing inbound invalidate and flush commands in a processor core in accordance with one embodiment.

With reference now to FIG. 9, there is illustrated a high level logical flowchart of an exemplary method of processing invalidate and flush commands in a processor core 120 of data processing system 100 in accordance with one embodiment. The process of FIG. 9 begins at block 900 in response to receipt by processor core 120 of an inbound command from L2 cache 130 via reload bus 174. In at least one preferred embodiment, the command specifies a command type and a target address.

The process then proceeds to block 902, which illustrates processor core 120 determining whether the inbound command is an RSV_Invalidate command or SN_Invalidate command as discussed above with reference to blocks 814 and 832. If so, the process passes to block 908, which is described below. If, however, the inbound command is not an RSV_Invalidate or SN_Invalidate command, processor core 120 additionally determines at block 904 whether or not the inbound command is a CO_Invalidate command as described above with reference to block 706. If not, meaning the command is a SN_Flush command as described above with reference to block 840, processor core 120 refrains from resetting any of wait flags 125, and the process proceeds directly to block 910, which is described below.

However, in response to a determination at block 904 that the command is a CO_Invalidate command, processor core 120 additionally determines at block 906 whether or not processing unit 102 is configured to permit a hardware thread of processor core 102 to remain in a wait state despite the castout or invalidation from L2 storage array and directory 140 of the cache line containing the flag on which the hardware thread was awaiting an update. If so, processor core 102 refrains from resetting any of wait flags 125, and the process passes to block 910. If, however, a negative determination is made at block 906, processor core 120 resets each wait flag 125 for which the associated address register 129 stores an address matching the target address of the inbound command (block 908). As discussed below with reference to block 1002 of FIG. 10, resetting the wait flag 125 of a hardware thread causes the hardware thread to end its wait state and resume execution.

The process of FIG. 9 passes from block 908 to block 910, which illustrates the processor core 120 invalidating in L1 cache 126 any valid copy of the target cache line identified by the target address of the inbound command, thus maintaining the inclusivity of L2 cache 130. Thereafter, the process of FIG. 9 ends at block 912.

Figure 10:
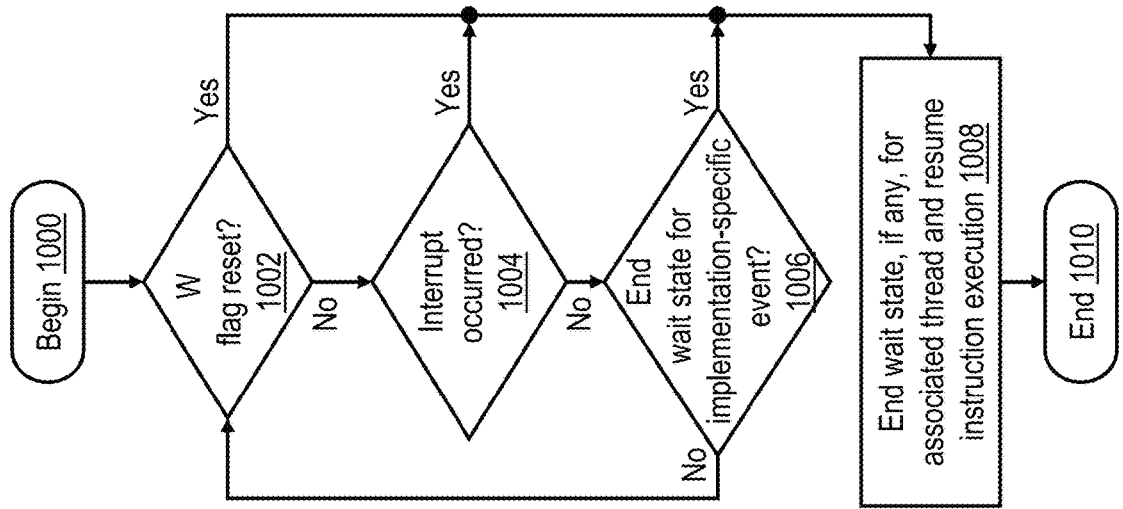
FIG. 10 is a high level logical flowchart of an exemplary method of managing the wait state of the hardware thread of a processor core in accordance with one embodiment.

Referring now to FIG. 10, there is depicted a high level logical flowchart of an exemplary method of managing the wait state of a hardware thread of a processor core in accordance with one embodiment. The illustrated process can be performed for each hardware thread supported by processor core 120 that is in a wait state, as indicated by the associated wait flag 125 being set.

The process of FIG. 10 begins at block 1000 and then proceeds to blocks 1002-1006, which illustrates processor core 120 monitoring for the occurrence of any event that would end the wait state of the hardware thread. For example, at block 1002, processor core 120 determines if the wait flag 125 associated with a hardware thread in a wait state has been reset, for example, at block 908 of FIG. 9. In addition, at block 1004, processor core 120 monitors for any interrupt for the hardware thread that is in the wait state. Processor core 120 additionally monitors at block 1006 for any implementation-specific event would indicate that the wait state of the hardware thread should be terminated. If none of these events is detected, the process of FIG. 10 continues to iterate at blocks 1002-1006. If, however, any of these events is detected, processor core 120 ends the wait state of the hardware thread and resumes instruction execution in the hardware thread (block 1008), either in the suspended instruction sequence or in an interrupt handler. Thereafter, the process of FIG. 10 ends at block 1010. It will be appreciated that, because wait flags 125 reside in processor core 120, the determination by the processor core 120 of whether a wait state of its hardware threads should end can made be at reduced latency as compared to prior art systems.

Figure 11:
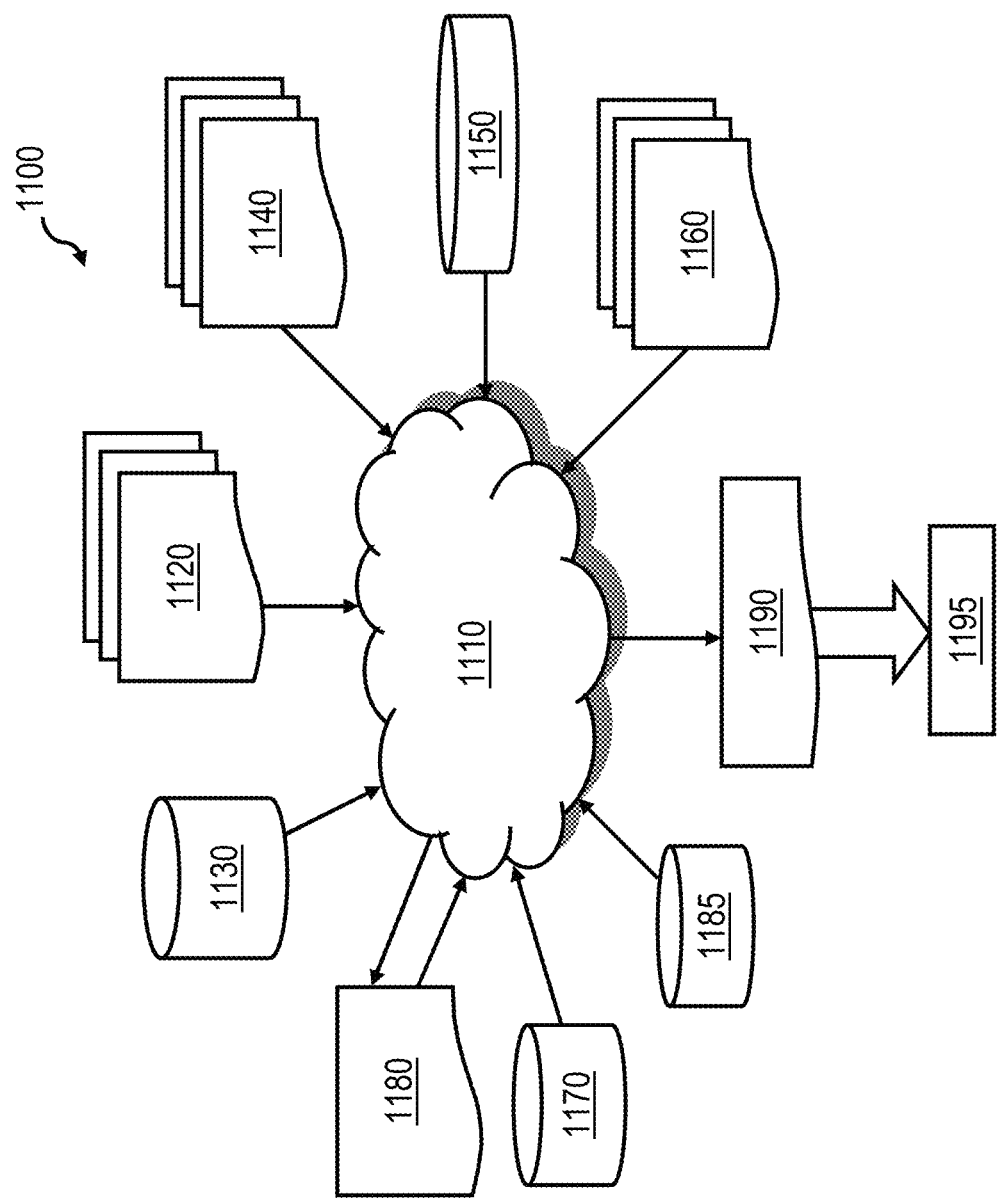
FIG. 11 is a block diagram of an exemplary design flow.

With reference now to FIG. 11, there is illustrated a block diagram of an exemplary design flow 1100 used for example, in semiconductor IC logic design, simulation, test, layout, and manufacture. Design flow 1100 includes processes, machines and/or mechanisms for processing design structures or devices to generate logically or otherwise functionally equivalent representations of the design structures and/or devices described above and shown herein. The design structures processed and/or generated by design flow 1100 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 1100 may vary depending on the type of representation being designed. For example, a design flow 1100 for building an application specific IC (ASIC) may differ from a design flow 1100 for designing a standard component or from a design flow 1100 for instantiating the design into a programmable array, for example a programmable gate array (PGA) or a field programmable gate array (FPGA) offered by Altera® Inc. or Xilinx® Inc.

FIG. 11 illustrates multiple such design structures including an input design structure 1120 that is preferably processed by a design process 1110. Design structure 1120 may be a logical simulation design structure generated and processed by design process 1110 to produce a logically equivalent functional representation of a hardware device. Design structure 1120 may also or alternatively comprise data and/or program instructions that when processed by design process 1110, generate a functional representation of the physical structure of a hardware device. Whether representing functional and/or structural design features, design structure 1120 may be generated using electronic computer-aided design (ECAD) such as implemented by a core developer/designer. When encoded on a machine-readable data transmission, gate array, or storage medium, design structure 1120 may be accessed and processed by one or more hardware and/or software modules within design process 1110 to simulate or otherwise functionally represent an electronic component, circuit, electronic or logic module, apparatus, device, or system such as those shown herein. As such, design structure 1120 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 1110 preferably employs and incorporates hardware and/or software modules for synthesizing, translating, or otherwise processing a design/simulation functional equivalent of the components, circuits, devices, or logic structures shown herein to generate a netlist 1180 which may contain design structures such as design structure 1120. Netlist 1180 may comprise, for example, compiled or otherwise processed data structures representing a list of wires, discrete components, logic gates, control circuits, PO devices, models, etc. that describes the connections to other elements and circuits in an integrated circuit design. Netlist 1180 may be synthesized using an iterative process in which netlist 1180 is resynthesized one or more times depending on design specifications and parameters for the device. As with other design structure types described herein, netlist 1180 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 1110 may include hardware and software modules for processing a variety of input data structure types including netlist 1180. Such data structure types may reside, for example, within library elements 1130 and include a set of commonly used elements, circuits, and devices, including models, layouts, and symbolic representations, for a given manufacturing technology (e.g., different technology nodes, 32 nm, 45 nm, 110 nm, etc.). The data structure types may further include design specifications 1140, characterization data 1150, verification data 1160, design rules 1190, and test data files 1185 which may include input test patterns, output test results, and other testing information. Design process 1110 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 1110 without deviating from the scope and spirit of the invention. Design process 1110 may also include modules for performing standard circuit design processes such as timing analysis, verification, design rule checking, place and route operations, etc.

Design process 1110 employs and incorporates logic and physical design tools such as HDL compilers and simulation model build tools to process design structure 1120 together with some or all of the depicted supporting data structures along with any additional mechanical design or data (if applicable), to generate a second design structure 1190. Design structure 1190 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 1120, design structure 1190 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 1190 may comprise a compiled, executable HDL simulation model that functionally simulates the devices shown herein.

Design structure 1190 may also employ a data format used for the exchange of layout data of integrated circuits and/or symbolic data format (e.g., information stored in a GDSII (GDS2), GL1, OASIS, map files, or any other suitable format for storing such design data structures). Design structure 1190 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 1190 may then proceed to a stage 1195 where, for example, design structure 1190: proceeds to tape-out, is released to manufacturing, is released to a mask house, is sent to another design house, is sent back to the customer, etc.

As has been described, in at least one embodiment, a data processing system includes multiple processing units all having access to a shared memory. A data processing system includes multiple processing units all having access to a shared memory. A processing unit includes a lower level cache memory and a processor core coupled to the lower level cache memory. The processor core includes an execution unit for executing instructions in a plurality of simultaneous hardware threads, an upper level cache memory, and a plurality of wait flags each associated with a respective one of the plurality of simultaneous hardware threads. The processor core is configured to set a wait flag among the plurality of wait flags to indicate the associated hardware thread is in a wait state in which the hardware thread suspends instruction execution and to exit the wait state based on the wait flag being reset.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a particular embodiment of a memory hierarchy has been described in which L1 and L2 caches are incorporated within a processing unit, those skilled in the art will appreciate that a greater or lesser number of levels of cache hierarchy may be employed. Further, these levels of cache hierarchy may include in-line or lookaside caches and may include one or more levels of off-chip cache. Further, the level of cache hierarchy at which coherency is determined may differ from that discussed with reference to the described embodiments.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A processing unit for a data processing system including a system interconnect, said processing unit comprising integrated circuitry including:
    a cache hierarchy including an upper level cache memory and a lower level cache memory, wherein the lower level cache memory includes a snoop machine that services memory access requests snooped on the system interconnect;
    a processor core coupled to the cache hierarchy, the processor core including:
        an execution unit for executing instructions in a plurality of simultaneous hardware threads; and
        a plurality of wait flags implemented separately from the cache hierarchy, wherein each of the plurality of wait flags is associated with a respective one of the plurality of simultaneous hardware threads, and wherein the processor core is configured to set a wait flag among the plurality of wait flags to indicate the associated hardware thread is in a wait state in which the associated hardware thread suspends instruction execution, to reset the wait flag based on receipt from the lower level cache memory of an invalidate command generated by the lower level cache memory based on a request snooped on the system interconnect by the snoop machine, and to exit the associated hardware thread from the wait state based on the wait flag being reset.

2. The processing unit of claim 1, wherein:
    the lower level cache memory includes reservation logic, the reservation logic including a plurality of reservation registers each uniquely associated with a respective one of the plurality of hardware threads, wherein each of the plurality of reservation registers is configured to track a reservation of established by the associated hardware thread for a memory address; and
    the processor core is configured to reset the wait flag based on receipt from the lower level cache memory of an invalidate command generated by the reservation logic based on cancellation of a reservation established by the associated hardware thread and tracked by an associated one of the plurality of reservation registers.

3. The processing unit of claim 1, wherein:
    the processor core includes an address register associated with the wait flag, wherein the address register specifies an address; and
    the processor core is configured to maintain the associated hardware thread in the wait state despite castout from the lower level cache memory of a cache line identified by the address.

4. The processing unit of claim 1, wherein:
    the processor core includes an address register associated with the wait flag, wherein the address register specifies an address; and
    the processor core is configured to reset the wait flag based on castout, from the lower level cache memory, of a cache line identified by the address.

5. The processing unit of claim 1, wherein the processor core is configured to place the hardware thread in the wait state and to set the wait flag based on execution of an explicit wait instruction.

6. A data processing system, comprising:
    a plurality of processing units in accordance with claim 1;
    a system interconnect coupling the plurality of processing units; and
    a system memory coupled to the system interconnect.

7. The processing unit of claim 1, wherein:
    the lower level cache memory includes reservation logic, the reservation logic including a plurality of reservation registers each associated with a respective one of the plurality of hardware threads, wherein each of the plurality of reservation registers is configured to track a reservation established by the associated hardware thread for a memory address; and
    the processor core is configured to set the wait flag to indicate the associated hardware thread is in the wait state based on execution, within the associated hardware thread, of a load-reserve instruction that initiates establishment, by the processor core, of a reservation in the reservation logic of the lower level cache for a memory address indicated by the load-reserve instruction.

8. The processing unit of claim 7, wherein the processor core is configured to reset the wait flag based on execution by a different hardware thread other than the associated hardware thread of a store-type instruction that targets the memory address.

9. A method of managing wait states in a processing unit of a data processing system including a system interconnect, the method comprising:
    in a processor core of the processing unit, executing instructions in a plurality of simultaneous hardware threads;
    buffering data for access by the processor core in a cache hierarchy within the processing unit, the cache hierarchy including an upper level cache memory and a lower level cache memory, wherein the lower level cache memory includes a snoop machine that services memory access requests snooped on the system interconnect; and maintaining, within the processor core, a plurality of wait flags separate from the cache hierarchy, wherein each of the plurality of wait flags is associated with a respective one of the plurality of simultaneous hardware threads, and wherein the maintaining includes setting a wait flag among the plurality of wait flags to indicate the associated hardware thread is in a wait state in which the hardware thread suspends instruction execution, resetting the wait flag based on receipt from the lower level cache memory of an invalidate command generated by the lower level cache memory based on a request snooped on the system interconnect by the snoop machine, and exiting the associated hardware thread from the wait state based on the wait flag being reset.

10. The method of claim 9, wherein:

the lower level cache memory includes reservation logic, the reservation logic including a plurality of reservation registers each uniquely associated with a respective one of the plurality of hardware threads, wherein each of the plurality of reservation registers is configured to track a reservation established by the associated hardware thread for a memory address; and the method further comprises the processor core resetting the wait flag based on receipt from the lower level cache memory of an invalidate command generated by the reservation logic based on cancellation of a reservation established by of the associated hardware thread and tracked by an associated one of the plurality of reservation registers.

11. The method of claim 9, wherein:

the processor core includes an address register associated with the wait flag, wherein the address register specifies an address; and the method further comprises the processor core maintaining the associated hardware thread in the wait state despite castout from the lower level cache memory of a cache line identified by the address.

12. The method of claim 9, wherein:

the processor core includes an address register associated with the wait flag, wherein the address register specifies an address; and the method further comprises the processor core resetting the wait flag based on castout, from the lower level cache memory, of a cache line identified by the address.

13. The method of claim 9, and further comprising the processor core placing the hardware thread in the wait state and setting the wait flag based on execution of an explicit wait instruction.

14. A design structure tangibly embodied in a machine-readable storage device for designing, manufacturing, or testing an integrated circuit, the design structure comprising:

a processing unit for a data processing system including a system interconnect, said processing unit including:
 a cache hierarchy including an upper level cache memory and a lower level cache memory, wherein the lower level cache memory includes a snoop machine that services memory access requests snooped on the system interconnect;
 a processor core coupled to the cache hierarchy, the processor core including:
  an execution unit for executing instructions in a plurality of simultaneous hardware threads; and
 a plurality of wait flags implemented separately from the cache hierarchy, wherein each of the plurality of wait flags is associated with a respective one of the plurality of simultaneous hardware threads, and wherein the processor core is configured to set a wait flag among the plurality of wait flags to indicate the associated hardware thread is in a wait state in which the associated hardware thread suspends instruction execution, to reset the wait flag based on receipt from the lower level cache memory of an invalidate command generated by the lower level cache memory based on a request snooped on the system interconnect by the snoop machine, and to exit the associated hardware thread from the wait state based on the wait flag being reset.

15. The design structure of claim 14, wherein:

the lower level cache memory includes reservation logic, the reservation logic including a plurality of reservation registers each uniquely associated with a respective one of the plurality of hardware threads, wherein each of the plurality of reservation registers is configured to track a reservation established by the associated hardware thread for a memory address; and the processor core is configured to reset the wait flag based on receipt from the lower level cache memory of an invalidate command generated by the reservation logic based on cancellation of a reservation established by the associated hardware thread and tracked by an associated one of the plurality of reservation registers.

16. The design structure of claim 14, wherein:

the processor core includes an address register associated with the wait flag, wherein the address register specifies an address; and the processor core is configured to maintain the associated hardware thread in the wait state despite castout from the lower level cache memory of a cache line identified by the address.

* * * * *